United States Patent [19]
Taniguchi et al.

[11] Patent Number: 6,075,885
[45] Date of Patent: Jun. 13, 2000

[54] METHOD OF AND APPARATUS FOR EXTRACTING CROSS PLANE AREA OF GAMUT AND COMPUTER PROGRAM PRODUCT FOR CARRYING OUT THE EXTRACTION

[75] Inventors: Kazutaka Taniguchi; Akihiro Nomura, both of Kyoto, Japan

[73] Assignee: Dainippon Screen Mfg. Co., Ltd., Kyoto, Japan

[21] Appl. No.: 09/031,040

[22] Filed: Feb. 26, 1998

[30] Foreign Application Priority Data

Feb. 28, 1997 [JP] Japan ................................. 9-062475

[51] Int. Cl.⁷ ............................................. G06K 9/00
[52] U.S. Cl. ........................... 382/162; 345/431; 358/518
[58] Field of Search ..................... 382/162, 166, 382/167; 358/518, 520; 345/431

[56] References Cited

U.S. PATENT DOCUMENTS

| 5,416,890 | 5/1995 | Beretta | 345/431 |
| 5,510,910 | 4/1996 | Bockman et al. | 358/520 |
| 5,883,632 | 3/1999 | Dillinger | 345/431 |

FOREIGN PATENT DOCUMENTS

| 0 665 682 A2 | 8/1995 | European Pat. Off. . |
| 8-30771 | 2/1996 | Japan . |

*Primary Examiner*—Bhavesh Mehta
*Attorney, Agent, or Firm*—McDermott, Will & Emery

[57] ABSTRACT

The method of the present invention first provides a plurality of representative color points existing on the surface of a gamut (s20), and sets a plurality of boundary lines that connect the plurality of representative color points substantially along the surface of the gamut (s22). The method subsequently defines a plurality of unit faces that are respectively surrounded by at least three boundary lines and arranged substantially along the surface of the gamut (s24), and sets a color plane to cross the gamut (s26). The method successively selects cross boundary lines that cross the color plane among the plurality of boundary lines, determines intersections of the cross boundary lines and the color plane, selects unit faces that cross the color plane based on the selected cross boundary lines, specifies cross lines of the selected unit faces and the color plane by connecting the intersections, and joins the cross lines to extract a contour of a cross plane area obtained by causing the color plane to cross the gamut (s28). This structure enables the contour of a cross plane area, which is obtained by causing a color plane to cross the gamut, to be accurately extracted even when the color plane is arranged at any arbitrary position and in any arbitrary orientation.

14 Claims, 20 Drawing Sheets

Fig. 3

| No. | C | M | Y | L | a | b |
|-----|---|---|---|---|---|---|
| 1 | 0 | 0 | 0 | 100.0 | 0.0 | 0.0 |
| 2 | 0 | 0 | $y_1$ | 95.0 | 0.0 | 20.0 |
| ⋮ | ⋮ | ⋮ | ⋮ | ⋮ | ⋮ | ⋮ |
| n | 0 | 0 | 255 | 85.0 | 0.0 | 100.0 |
| ⋮ | ⋮ | ⋮ | ⋮ | ⋮ | ⋮ | ⋮ |
| $n^2$ | 0 | 255 | 255 | 50.0 | 50.0 | 50.0 |
| ⋮ | ⋮ | ⋮ | ⋮ | ⋮ | ⋮ | ⋮ |
| $n^3$ | 255 | 255 | 255 | 0.0 | 0.0 | 0.0 |

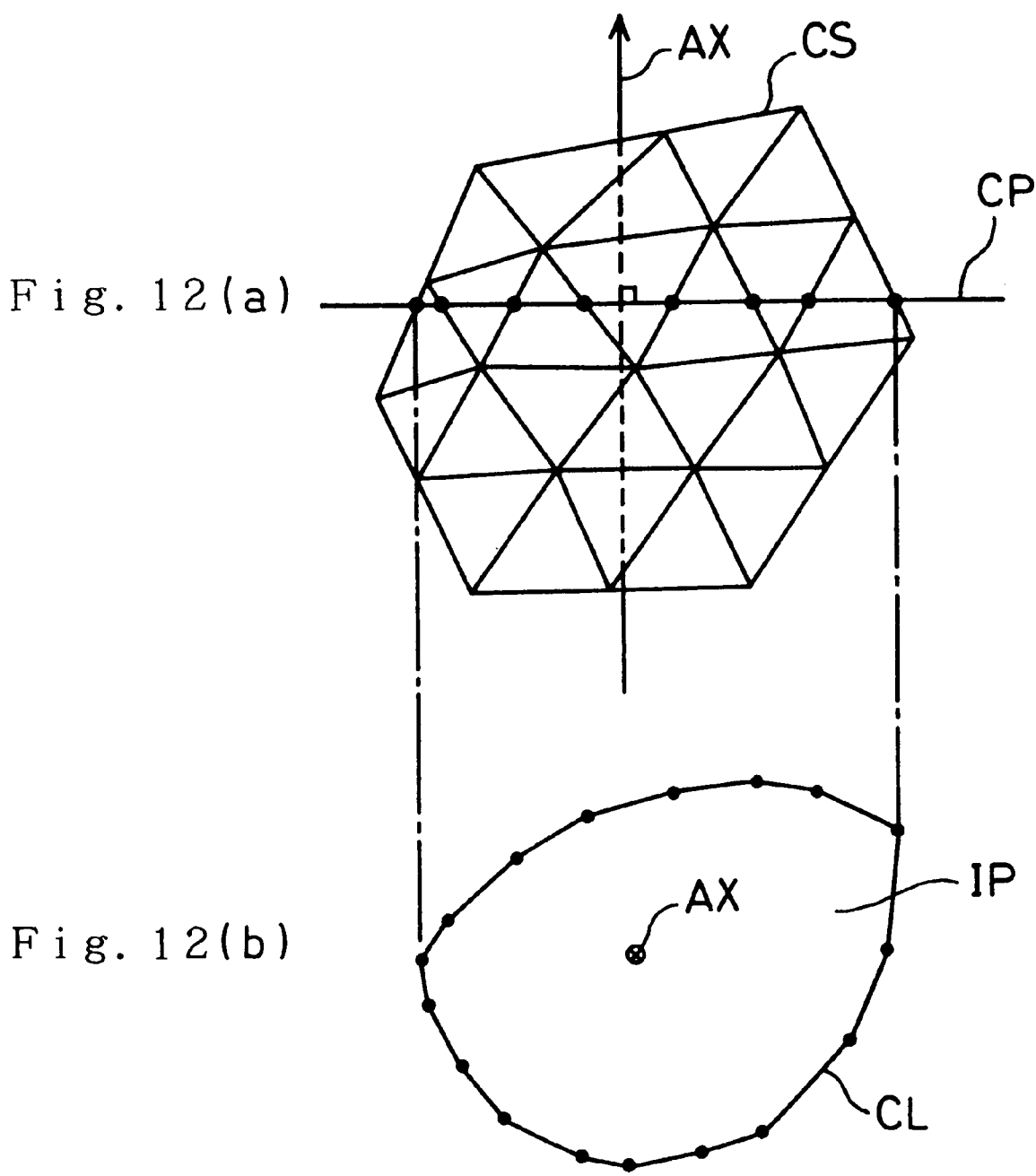

METHOD OF AND APPARATUS FOR EXTRACTING CROSS PLANE AREA OF GAMUT AND COMPUTER PROGRAM PRODUCT FOR CARRYING OUT THE EXTRACTION

BACKGROUND OF THE INVENTION

1. Field of the Invention

The present invention relates to a technique for extracting a contour of a cross plane area, which is obtained by causing a desired color plane to cross a gamut that represents a color reproducible range of a device, such as a printer, a monitor, or a scanner, in order to enable the user to recognize the exact shape of the gamut.

2. Description of the Related Art

All the colors reproducible by a certain device are plotted as color points in an adequate color space, for example, in an L*a*b* (L*, a*, and b* are hereinafter simply expressed as L, a, and b) color space of CIE (Commission Internationale de Elclairage). This gives a color solid in the color space. The color solid is a gamut characteristic of the certain device and represents a total range of the colors reproducible by the device. The surface of the gamut corresponds to the limit of the colors reproducible by the device.

The shape of the gamut depends upon the type of the device, such as a printer, amonitor, or a scanner, andmore specifically upon the individual devices.

A proposed method for enabling the user to recognize the shape of the gamut is disclosed in, for example, European Patent Publication No. 0665682.

This proposed method first specifies a plurality of color points arranged at equal intervals along the respective coordinate axes in the Lab color space as representative color points included in a gamut of a certain device. Apredetermined color plane perpendicular to the axis L (that is, a face of identical brightness) is then set to cross the gamut and pass through a plurality of representative color points. A plurality of representative color points that are arranged at equal intervals along the axis a and the axis b accordingly exist in the area of a cross plane of the color plane and the gamut. The method then connects representative color points located in the outer-most portion among the plurality of representative color points existing in the cross plane area, so as to extract an outer line corresponding to a part of the contour of the cross plane area. The position of the color plane to cross the gamut is then shifted along the axis L by the interval between the representative color points, and the same process is repeated to extract an outer line corresponding to another part of the contour of the cross plane area. This method enables the user to finally recognize the exact shape of the gamut.

Another proposed method for enabling the user to recognize the shape of the gamut causes a color plane including the axis L (that is, a face of identical hue) to cross the gamut.

In the related art techniques, a color plane crossing the gamut is set to pass through a plurality of representative color points. These techniques accordingly do not enable the contour of a cross plane area, which is obtained by causing a color plane arranged at an arbitrary position (for example, a color plane arranged to pass between the representative color points) to cross the gamut, to be accurately extracted.

The related art techniques set only either the color planes perpendicular to the axis L (that is, the faces of identical brightness) or the color planes including the axis L (that is, the faces of identical hue) to cross the gamut, in order to extract outer lines corresponding to the contour of a cross plane area with respect to the faces of identical brightness or the faces of identical hue. These techniques are not well applicable to extract the contour of a cross plane area obtained by causing a color plane that is other than the face of identical brightness or the face of identical hue but is arranged in an arbitrary orientation to cross the gamut.

SUMMARY OF THE INVENTION

The object of the present invention is thus to provide a technique of enabling the contour of a cross plane area, which is obtained by causing a color plane to cross the gamut, to be accurately extracted even when the color plane is arranged at any arbitrary position and in any arbitrary orientation.

At least part of the above and the other related objects is realized by a method of the present invention, which connects a plurality of representative color points on the surface of a gamut to set a plurality of boundary lines, and defines a plurality of unit faces respectively surrounded by some of these boundary lines. The method then selects unit faces that cross a color plane among a plurality of unit faces arranged substantially along the surface of the gamut and obtains cross lines of the unit faces and the color plane. The method subsequently joins the cross lines, so as to extract a contour of a cross plane area obtained by causing the color plane to cross the gamut.

The unit face or any one of the boundary lines surrounding the unit face may be included in the color plane.

The structure of the present invention can determine the cross lines even when the unit faces cross the color plane in any state. Namely the method of the present invention can obtain cross lines of the unit faces and the color plane even when the color plane is arranged at any arbitrary position and in any arbitrary orientation, thereby enabling the contour of a cross plane area of the gamut and the color plane to be accurately extracted.

In accordance with one preferable application, the method carries out the following process after setting the plurality of unit faces. The preferable process selects a first cross boundary line that crosses the color plane and determines an intersection of the first cross boundary line and the color plane. The process then selects a unit face surrounded by a plurality of boundary lines including the first cross boundary line. The process subsequently selects a next cross boundary line that crosses the color plane among the boundary lines surrounding the selected unit face other than the first cross boundary line, and determines an intersection of the next cross boundary line and the color plane. The process selects a unit face surrounded by a plurality of boundary lines including the next cross boundary line, selects a new cross boundary line that crosses the color plane among the boundary lines surrounding the selected unit face other than the next cross boundary line, and determines an intersection of the new cross boundary line and the color plane. The processing is repeatedly executed in this manner. The process eventually connects the intersections thus obtained to obtain cross lines and joins the cross lines to extract the contour of the cross plane area.

The procedure, which successively selects cross boundary lines that cross the color plane and determines their intersections, enhances the processing speed of selecting the unit faces that cross the color plane and specifying the cross lines.

In accordance with another preferable application, the method carries out the following process after setting the plurality of unit faces. The preferable process selects a first unit face that crosses the color plane, and then selects a next unit face that crosses the color plane among a plurality of unit faces adjoining to the first unit face. The processing is repeatedly executed to select the unit faces that cross the color plane. The process subsequently specifies cross lines obtained by causing the selected unit faces to cross the color plane and joins the cross lines to extract the contour of the cross plane area.

The procedure, which selects a next unit face that crosses the color plane among a plurality of unit faces adjoining to the previously selected unit face, enables only the unit faces crossing the color plane to be selected at a high speed without examining all the unit faces included in the gamut.

These and other objects, features, aspects, and advantages of the present invention will become more apparent from the following detailed description of the preferred embodiment with the accompanying drawings.

BRIEF DESCRIPTION OF THE DRAWINGS

FIG. 3 shows mapping of the tone values of C, M, and Y color data input into a certain printer to the values of L, a, and b color data obtained as the results of calorimetric measurement;

FIGS. 12(a) and 12(b) show a contour CL of a cross plane area IP extracted according to the cross plane area extraction process shown in the flowcharts of FIGS. 8 and 9;

DESCRIPTION OF THE PREFERRED EMBODIMENTS

Figure 1:
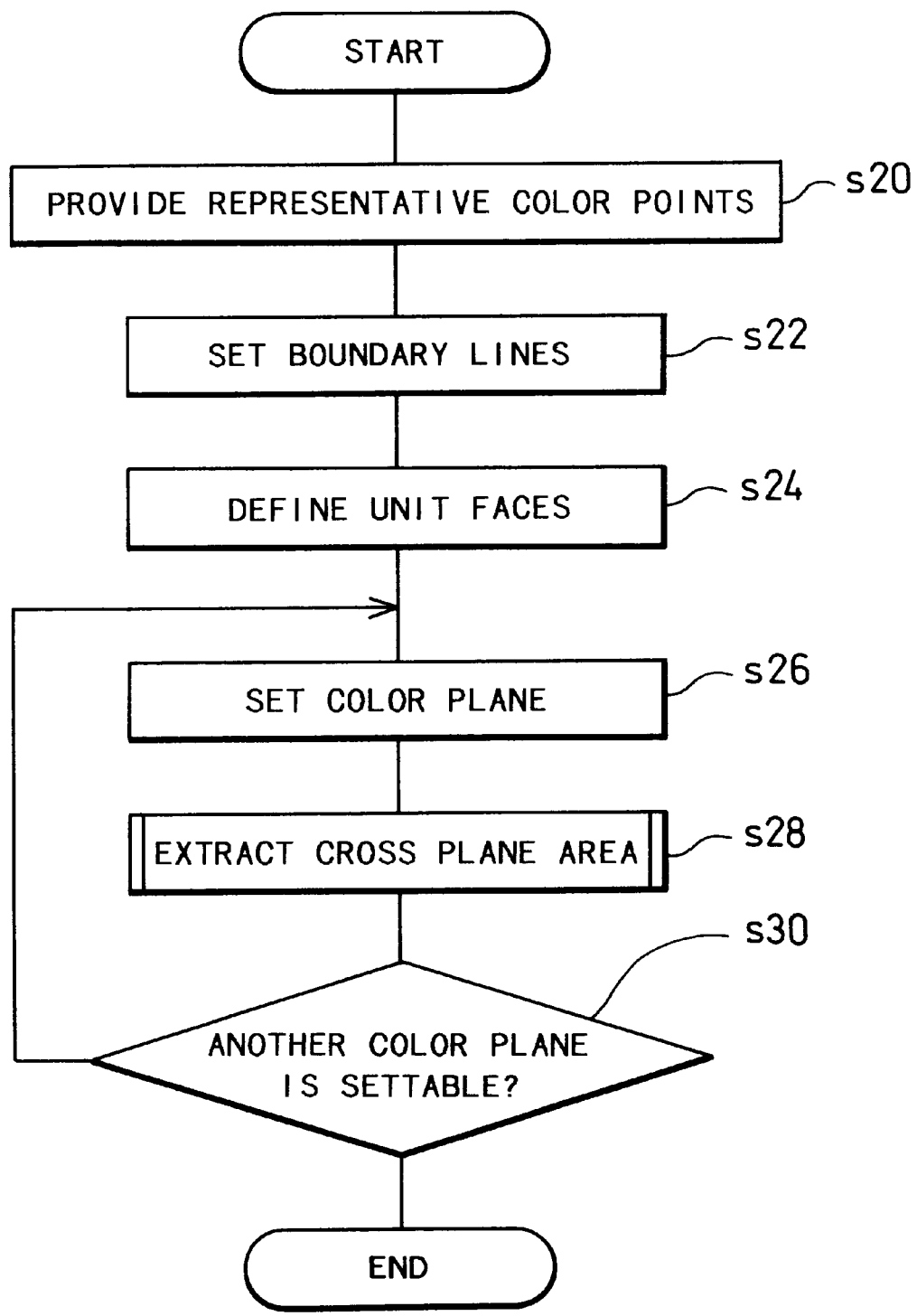
FIG. 1 is a flowchart showing a processing routine of gamut cross plane area extraction method embodying the present invention.
Figure 2:
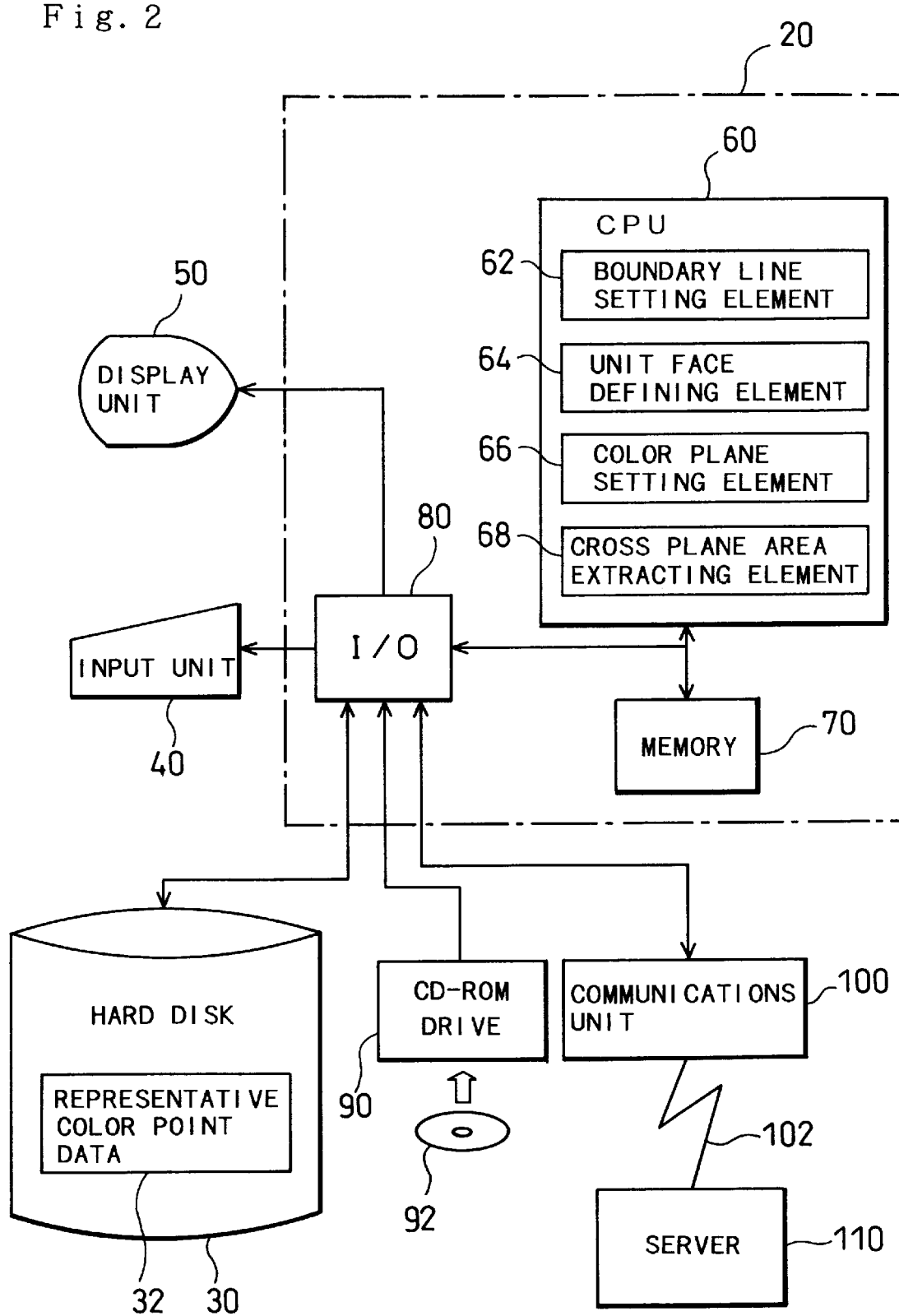
FIG. 2 is a block diagram illustrating a gamut cross plane area extraction apparatus for realizing the gamut cross plane area extraction method shown in the flowchart of FIG. 1.

One mode of carrying out the present invention is discussed below as a preferred embodiment. FIG. 1 is a flowchart showing a processing routine of gamut cross plane area extraction method embodying the present invention. FIG. 2 is a block diagram illustrating a gamut cross plane area extraction apparatus for realizing the gamut cross plane area extraction method shown in the flowchart of FIG. 1.

The gamut cross plane area extraction apparatus shown in FIG. 2 includes a computer 20 constructed, for example, as a work station, a hard disk 30 for storing representative color point data 32 and other relevant data, an input unit 40 including keyword and a mouse, through which the user inputs instructions, a display unit 50, such as a CRT, for displaying images, a CD-ROM drive 90, and a communications unit 100, such as a modem or a network card.

The computer 20 includes a CPU 60 for executing a variety of processes according to computer programs, a memory 70 for temporarily registering the computer programs and data obtained in the course of the processing, and an I/O circuit 80 for transmitting and receiving data to and from the hard disk 30, the input unit 40, the display unit 50, the CD-ROM drive 90, and the communications unit 100.

The computer programs that cause the CPU 60 to realize the functions of the respective processes in the gamut cross plane extraction method shown in the flowchart of FIG. 1 are registered in the memory 70 or internal storage device. The CPU 22 successively reads the computer programs from the memory 70 and realizes the functions of a boundary line setting element 62, a unit face defining element 64, a color plane setting element 66, and a cross plane area extracting element 68.

A CD-ROM 92 in which the computer programs and a variety of data are recorded is inserted in the CD-ROM drive 90, whereas a server 110 is connected to the communications unit 100 via a network 102. The server 110 functions as a program supply unit for supplying the computer programs to the computer system ia the network 102.

The computer programs registered in the memory 70 are supplied in the form recorded in a computer readable recording medium, such as the CD-ROM 92. The computer programs recorded in the recording medium are read by a reading device, such as the CD-ROM drive 90, and transferred to and stored in the hard disk 30 or external storage device. The computer programs are further transferred to the memory 70 or internal storage device at the time of activation or at another required occasion. The computer programs may alternatively be transferred to the memory 70 not via the hard disk 30 but directly.

The computer programs may otherwise be supplied from the server 110 or program supply unit to the computer system via the network 102.

In the specification hereof, the computer system or computer implies both the hardware and its operating system and more specifically represents the hardware operating under the control of the operating system. In case that no operating system is required and applications programs alone can operate the hardware, the hardware itself corresponds to the computer. The hardware at least includes a microprocessor, such as the CPU 60, and a reading device, such as the CD-ROM drive 90, for reading the computer programs recorded in the recording medium. The computer programs include program codes that cause the computer to realize the functions of the respective constituents. Part of these functions may be realized by the operating system instead of the applications programs.

In this embodiment, the CD-ROM is used as the recording medium, in which the computer programs are recorded in a computer readable form. Other applicable examples include a variety of media readable by the computer, such as flexible disks, magneto-optic discs, IC cards, ROM cartridges, punch cards, prints with bar codes or other codes printed thereon, and internal storage devices (memories like RAMs and ROMs) and external storage devices of the computer.

The following describes the gamut cross plane area extraction method of the embodiment according to the flowchart of FIG. 1. When the program enters the routine of FIG. 1, a process of providing representative color points is carried out at step s20. More concretely the process provides a plurality of representative color points existing on the surface of a target color solid or gamut. In order to enable the user to recognize the exact shape of a gamut representing a color reproducible range of a certain printer (not shown), for example, C (cyan), M (magenta), and Y (yellow) color data with respect to a plurality of specific colors are input into the printer, which subsequently prints the plurality of specific colors to produce color chips. The respective colors printed on the color chips are then measured with a calorimetric device as L, a, and b color data. In this manner, the C, M, and Y color data input into the certain printer are mapped to the L, a, and b color data output from the certain printer.

FIG. 3 shows mapping of the tone values of C, M, and Y color data input into a certain printer to the values of L, a, and b color data obtained as the results of calorimetric measurement.

The input C, M, and Y color data have the tone values, which are respectively arranged at equal intervals in the range of 0 (minimum tone value) to 255 (maximum tone value). In the table of FIG. 3, $y_1$ denotes a second-step tone value of the Y color data.

The input color datamaybeR (red), G (green), andB (blue) color data, instead of the C, M, and Y color data used in this embodiment. Although the tone values of the C, M, and Y color data are arranged at equal intervals in the embodiment, the C, M, and Y color data may have the tone values arranged at unequal intervals but the density values arranged at equal intervals. While the L, a, and b color data are obtained as the results of calorimetric measurement in this embodiment, data of any calorimetric system may be used instead, as long as the calorimetric system has the concepts of brightness, hue, and saturation and forms a uniform color space.

The procedure of this embodiment inputs the C, M, and Y color data into an object printer to produce color chips, and measures the color chips with a calorimetric device to obtain the corresponding L, a, and b color data. In case that the mapping relation of the C, M, and Y color data to the L, a, and b color data with respect to the object printer has been given in advance in the form of a polynomial or a determinant, the possible procedure substitutes the values of the C, M, and Y color data into the polynomial or determinant to obtain the corresponding values of the L, a, and b color data. In case that the mapping relation has been given in advance in the form of a lookup table or a neural network, on the other hand, the possible procedure inputs the C, M, and Y color data into the circuit and causes the circuit to output the corresponding L, a, and b color data.

It is here assumed that the C, M, and Y color data respectively have the tone values of n steps. The number of the C, M, and Y color data and the number of the corresponding L, a, and b color data are both equal to $n^3$ as shown in FIG. 3. Color points are plotted in a CMY color space and an Lab color space based on these C, M, and Y color data and L, a, and b color data. The plotted color points form gamuts of the object printer both in the CMY color space and in the Lab color space. This means that each gamut of the printer is expressed by the $n^3$ representative color points.

The representative color points existing on the surface of the gamut in the CMY color space are those having the tone value of at least one of the C, M, and Y color data equal to the minimum tone value or the maximum tone value. When the C, M, andY color data respectively have the tone values of n steps, the number of the representative color points existing on the surface of the gamut is equal to $n^3-(n-2)^3$.

The representative color points existing on the surface of the gamut in the CMY color space are always mapped to the representative color points existing on the surface of the gamut in the Lab color space. Namely the representative color points existing on the surface of the gamut in the Lab color space are those expressed by L, a, and b color data corresponding to the C, M, and Y color data, where the tone value of at least one of the C, M, and Y color data is equal to the minimum tone value or the maximum tone value.

FIGS. 4(*a*) and 4(*b*) respectively show the representative color points existing on the surface of specific gamuts in the CMY color space and in the Lab color space, wherein C, M, and Y denote the color points of cyan, magenta, and yellow, R, G, and B the color points of red, green, and blue, and W and K the color points of white and black. In the example of FIG. 4, the C, M, and Y color data respectively have the tone values of n=3 steps. Since n is equal to 3, the number of the representative color points existing on the surface of the gamut is equal to $3^3-(3-2)^3=26$.

As discussed above, the procedure of this embodiment extracts only the representative color points existing on the surface of the gamut from a plurality of representative color points constituting the whole gamut and stores data of the extracted representative color points into the hard disk 30 shown in FIG. 2. In this embodiment, a boundary connecting the adjoining representative color points to each other is a straight line (line segment) and is hereinafter referred to as the boundary line.

After a plurality of representative color points existing on the surface of the gamut are provided, the boundary line setting element 62 of the CPU 60 executes a process of setting boundary lines at step s22 in the flowchart of FIG. 1 and the unit face defining element 64 executes a process of defining unit faces at step s24.

The boundary line setting element 62 reads the Lab color data out of the data of the representative color points stored in the hard disk 30 and sets a plurality of boundary lines that respectively connect the adjoining representative color points to each other in the Lab color space, based on the Lab color data read from the hard disk 30. The respective boundary lines are arranged to be continuous substantially along the surface of the gamut. In other words, no boundary lines are set to pass through the gamut.

The unit face defining element 64 defines a plurality of unit faces surrounded by the boundary lines set in the above manner. The respective unit faces represent planes and are arranged to be substantially along the surface of the gamut and cover the whole surface of the gamut.

Figure 4B:
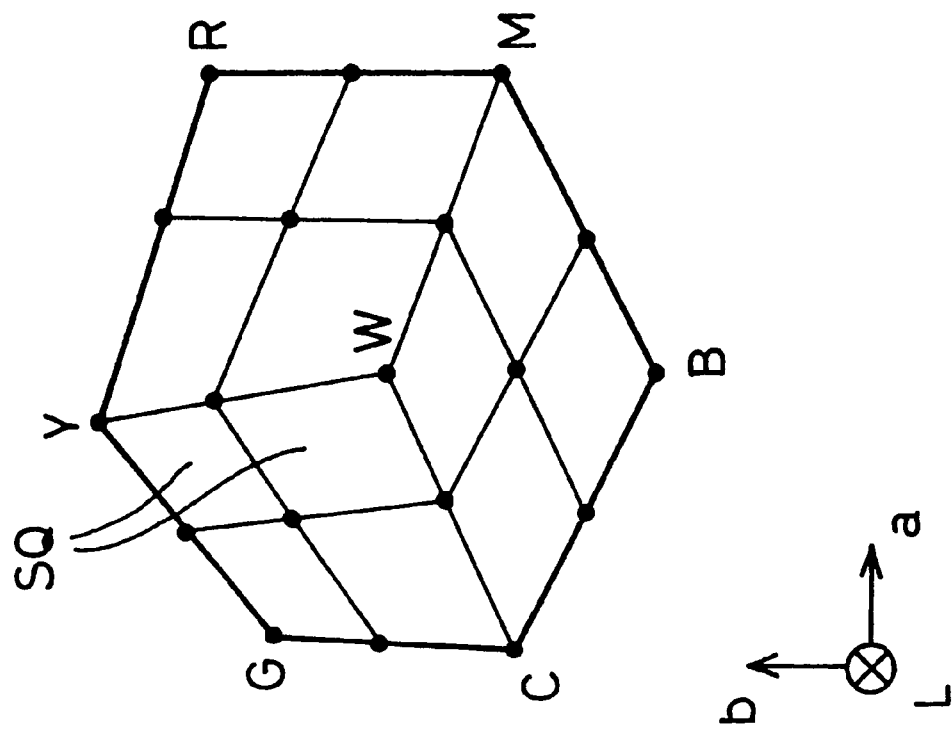
FIGS. 4(a) and 4(b) respectively show representative color points existing on the surface of specific gamuts in the CMY color space and in the Lab color space.
Figure 4A:
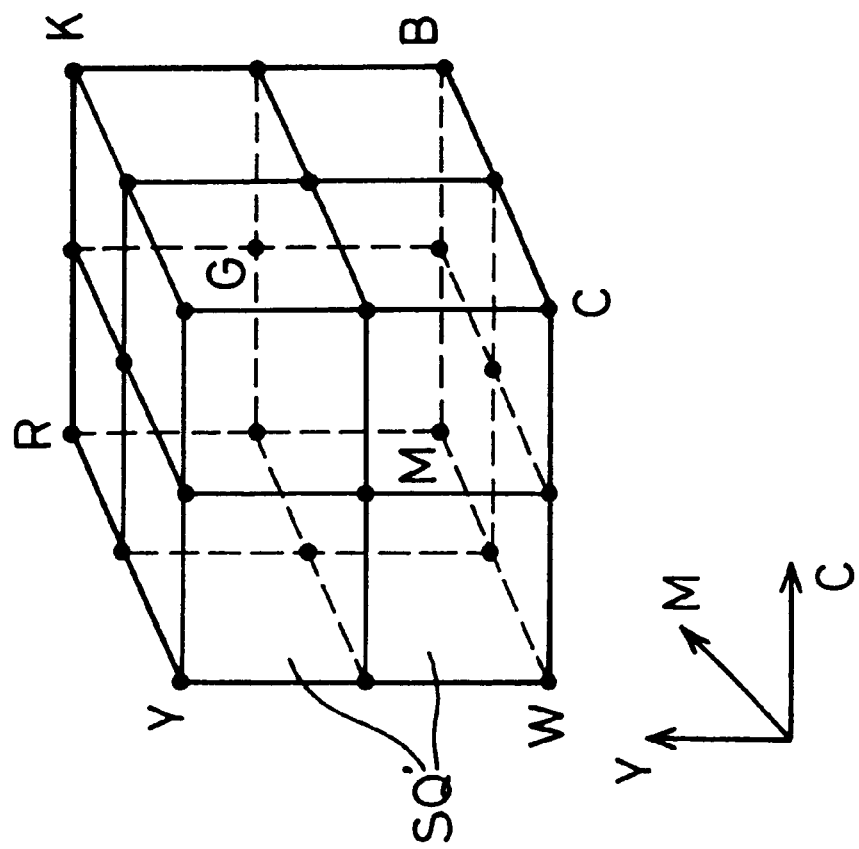

A simple method defines each unit face as a quadrangle face surrounded by four boundary lines as shown in FIG. 4. While each unit face SQ' surrounded by four boundary lines is a plane in the CMY color space as shown in FIG. 4(a), however, four representative color points or joints of the four boundary lines surrounding each unit face SQ do not always exist on one plane in the Lab color space as shown in FIG. 4(b). In the Lab color space, the unit face SQ surrounded by the four boundary lines is often a curved surface.

The procedure of this embodiment accordingly draws a boundary line to connect a representative color point of the smallest serial number with a representative color point of the largest serial number among the four representative color points. Namely each unit face SQ surrounded by the four boundary lines (that is, a quadrangle unit face) is divided into two unit faces surrounded by the three boundary lines (that is, triangle unit faces). This procedure makes all the unit faces plane.

Figure 5B:
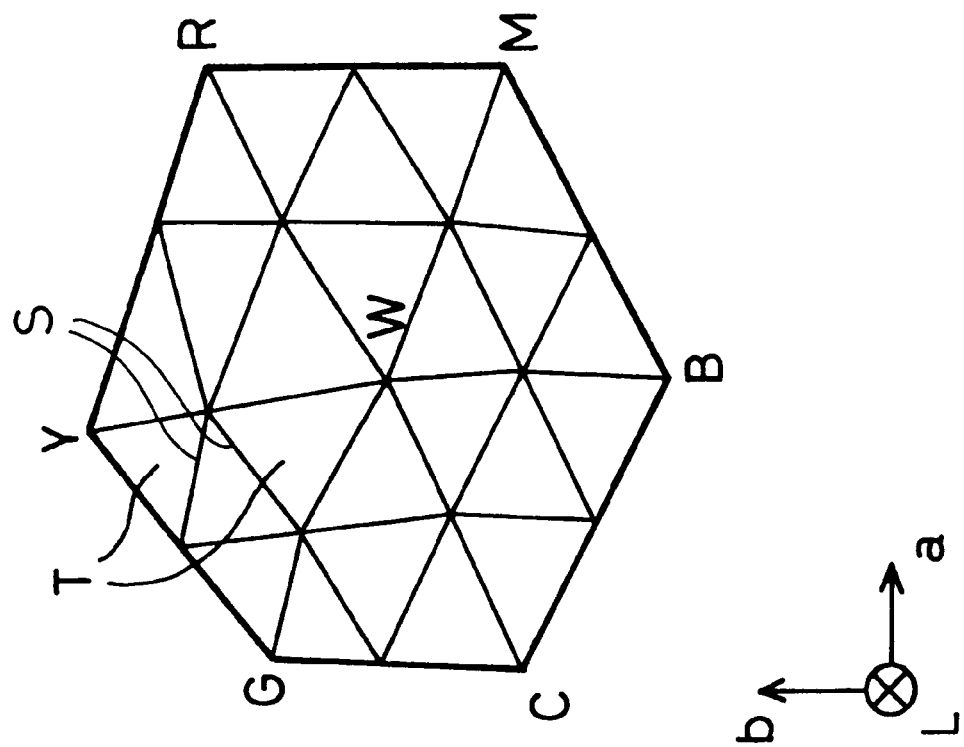
FIGS. 5(a) and 5(b) respectively show triangle unit faces covering the surface of the gamuts in the CMY color space and in the Lab color space as one example.
Figure 5A:
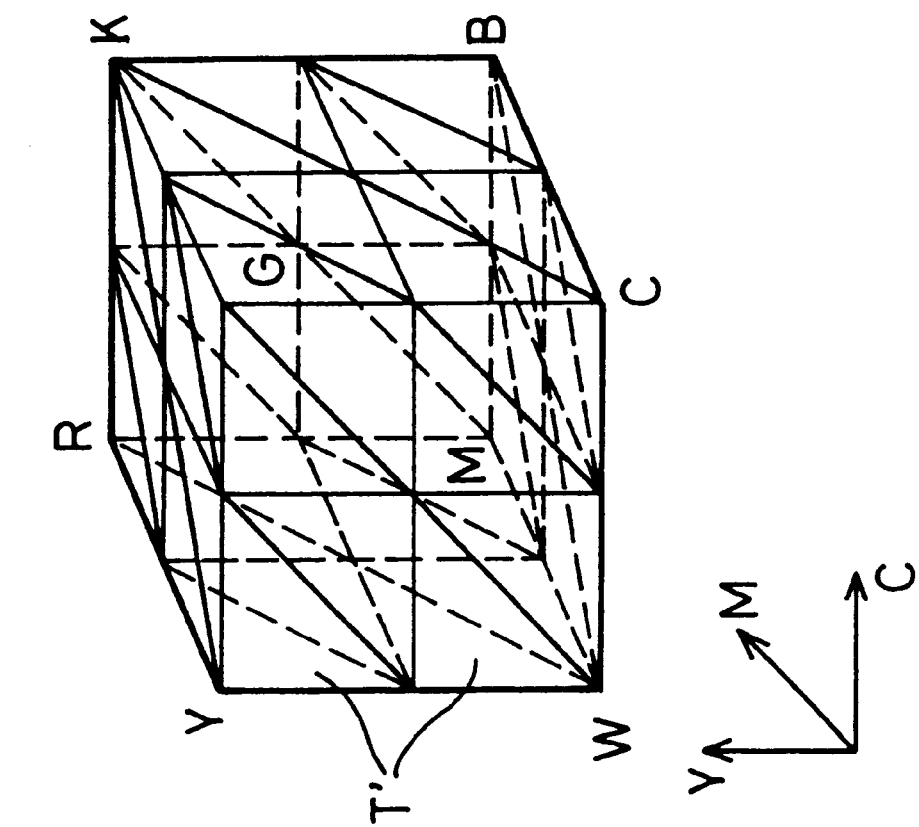

FIGS. 5(a) and 5(b) respectively show triangle unit faces covering the surface of the gamuts in the CMY color space and in the Lab color space as one example.

The number of the triangle unit faces is determined in the following manner. There are $(n-1)^2$ quadrangle unit faces SQ' on each face of the gamut in the CMY color space as shown in FIG. 4. Each quadrangle unit face includes two triangle unit faces T' as shown in FIG. 5(a). Since the gamut has six faces, the total number of the triangle unit faces T' is equal to $12 \cdot (n-1)^2$. The number of the unit faces T' in the CMY color space is identical with the number of unit faces T in the Lab color space, so that the total number of the triangle unit faces T in the Lab color space is also equal to $12 \cdot (n-1)^2$.

The number of boundary lines S is determined in the following manner. Each triangle unit face T has three boundary lines S, and each boundary line S is shared by the two adjoining triangle unit faces T. The total number of the boundary lines S is accordingly equal to $18 \cdot (n-1)^2$.

The boundary line setting element 62 and the unit face defining element 64 respectively allocate serial numbers to the boundary lines S and to the triangle unit faces T set in the above manner. The boundary line setting element 62 and the unit face defining element 64 then register information regarding the serial numbers of the unit faces T adjoining to each triangle unit face T and the serial numbers of the boundary lines S shared by the adjoining triangle unit faces T into the memory 70 or the hard disk 30 shown in FIG. 2. Information regarding the serial numbers of the unit faces T that share each boundary line S is also registered in the memory 70 or the hard disk 30.

As discussed above, the procedure of this embodiment draws a boundary line to connect a representative color point of the smallest serial number with a representative color point of the largest serial number among the four representative color points, and divides each unit face surrounded by the four boundary lines (that is, a quadrangle unit face) into two unit faces surrounded by the three boundary lines (that is, triangle unit faces), thereby making all the unit faces plane. An alternative procedure provides a new representative color point at the position corresponding to the center of the quadrangle unit face and draws boundary lines that connect the new representative color point with the four representative color points. This procedure accordingly divides each quadrangle unit face into four triangle unit faces and makes all the unit faces plane as shown in FIGS. 6(a) and 6(b).

Figure 6A:
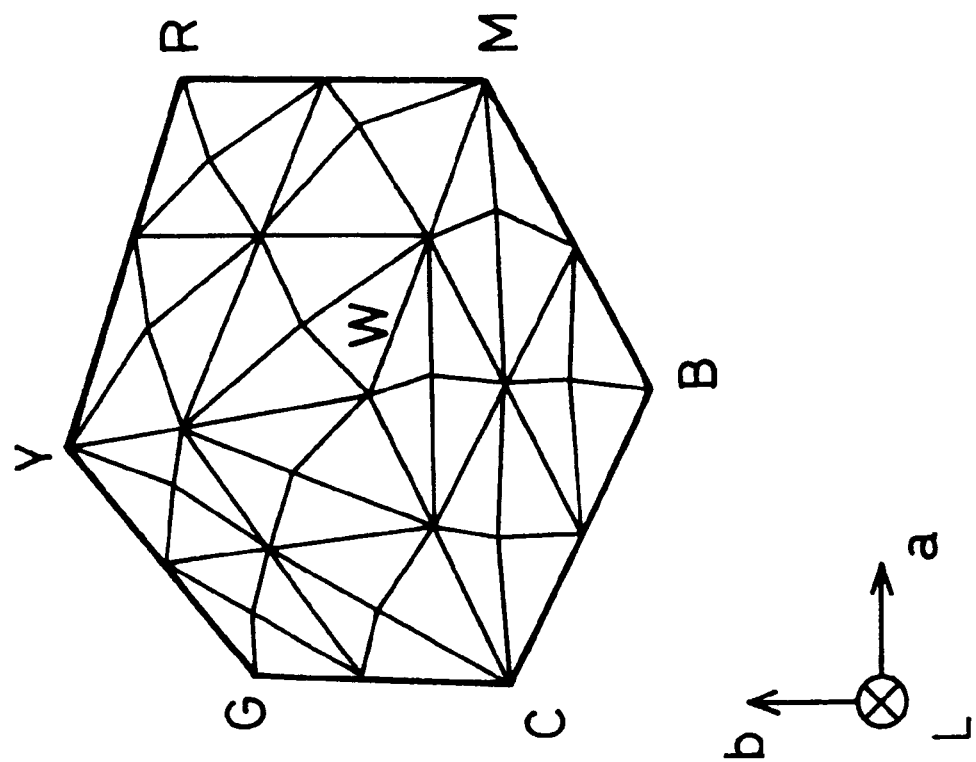
FIGS. 6(a) and 6(b) respectively show triangle unit faces covering the surface of the gamuts in the CMY color space and in the Lab color space as another example.
Figure 6B:
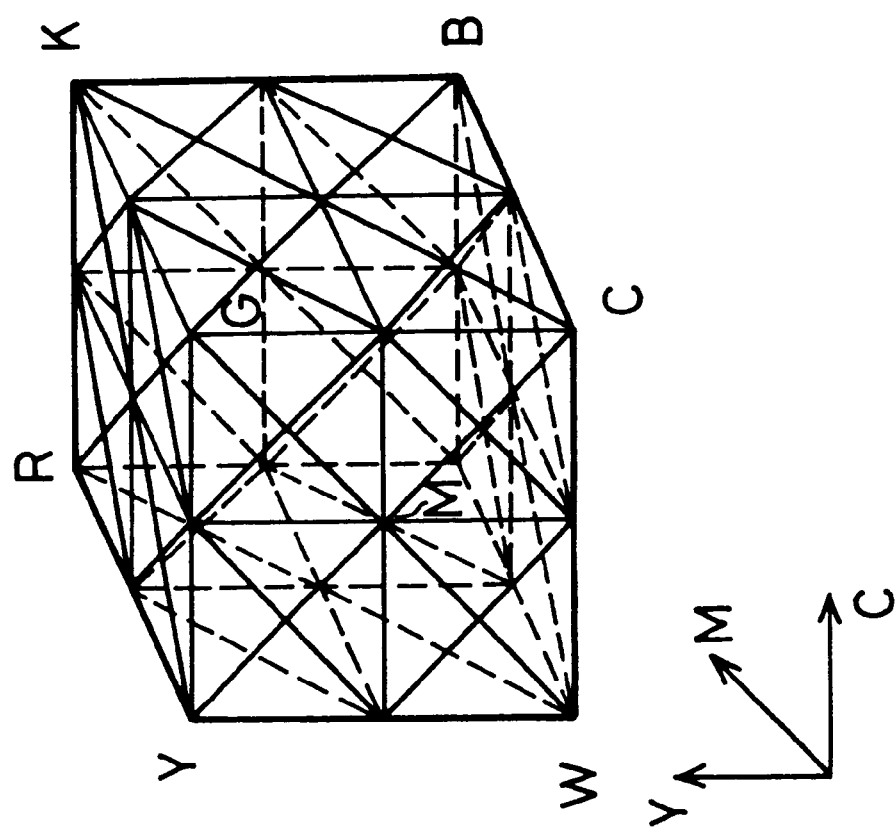

FIGS. 6(a) and 6(b) respectively show triangle unit faces covering the surface of the gamuts in the CMY color space and in the Lab color space as another example.

After the boundary line setting element 62 sets a plurality of boundary lines substantially along the surface of the gamut and the unit face defining element 64 defines a plurality of unit faces surrounded by the boundary lines, the color plane setting element 66 of the CPU 60 executes a process of setting a color plane at step s26 in the flowchart of FIG. 1.

Namely the color plane setting element 66 sets one color plane that crosses the gamut in the Lab color space.

Figure 7:
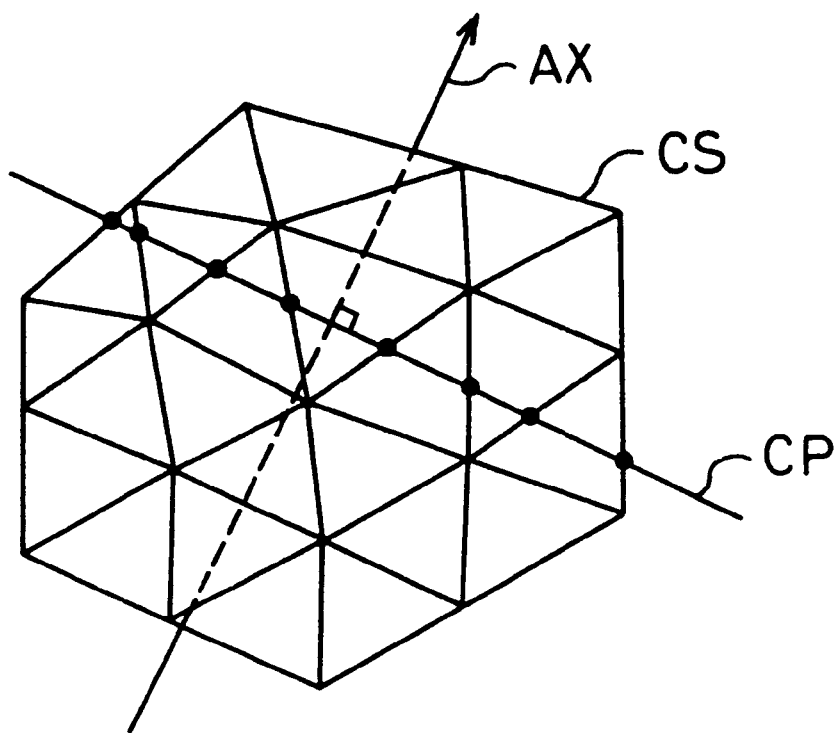
FIG. 7 shows a gamut in the Lab color space and a color plane that crosses the gamut.

FIG. 7 shows a gamut in the Lab color space and a color plane that crosses the gamut. When a predetermined reference axis AX passing through a gamut CS has been set in advance in the Lab color space as shown in FIG. 7, the color plane setting element 66 sets a color plane CP that perpendicularly crosses the reference axis AX.

The cross plane area extracting element 68 of the CPU 60 then executes a process of extracting a cross plane area at step s28, based on the boundary lines set at step s22, the unit faces defined at step s24, and the color plane CP set at step s2661 .

The cross plane area extracting element 68 successively selects boundary lines that cross the color plane CP (hereinafter may be referred to as cross boundary lines) among the plurality of boundary lines and determines intersections of the cross boundary lines and the color plane CP. The cross plane area extracting element 68 then selects unit faces that intersect the color plane CP out of the plurality of unit faces based on the selected cross boundary lines and connects the intersections by straight lines to specify cross lines of the selected unit faces and the color plane CP. The cross plane area extracting element 68 subsequently joins the cross lines and thereby extracts a contour of a cross plane area obtained by causing the color plane CP to cross the gamut CS.

Figure 8:
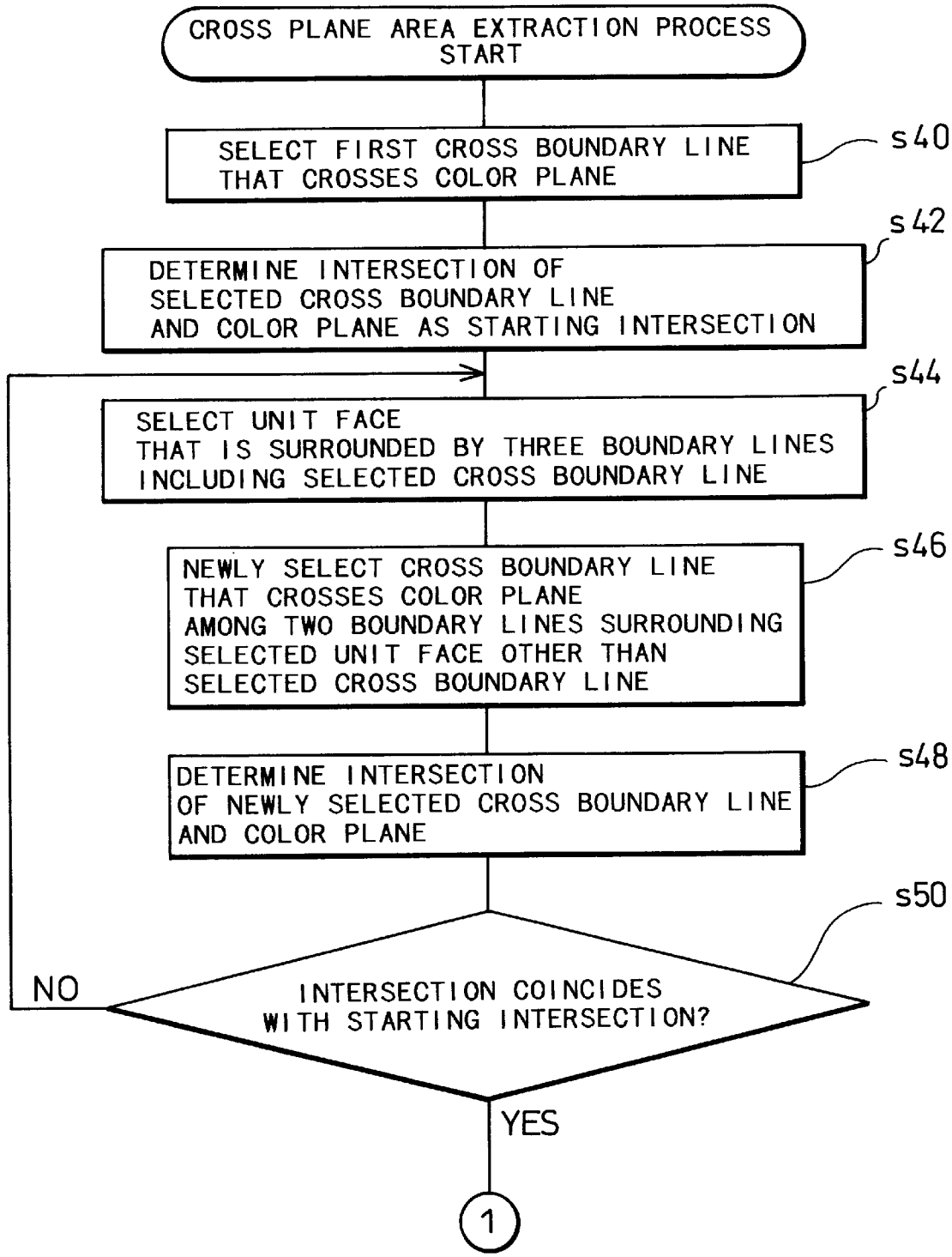
FIGS. 8 and 9 are flowcharts showing one procedure of the cross plane area extraction process executed at step s28 in the flowchart of FIG. 1.
Figure 9:
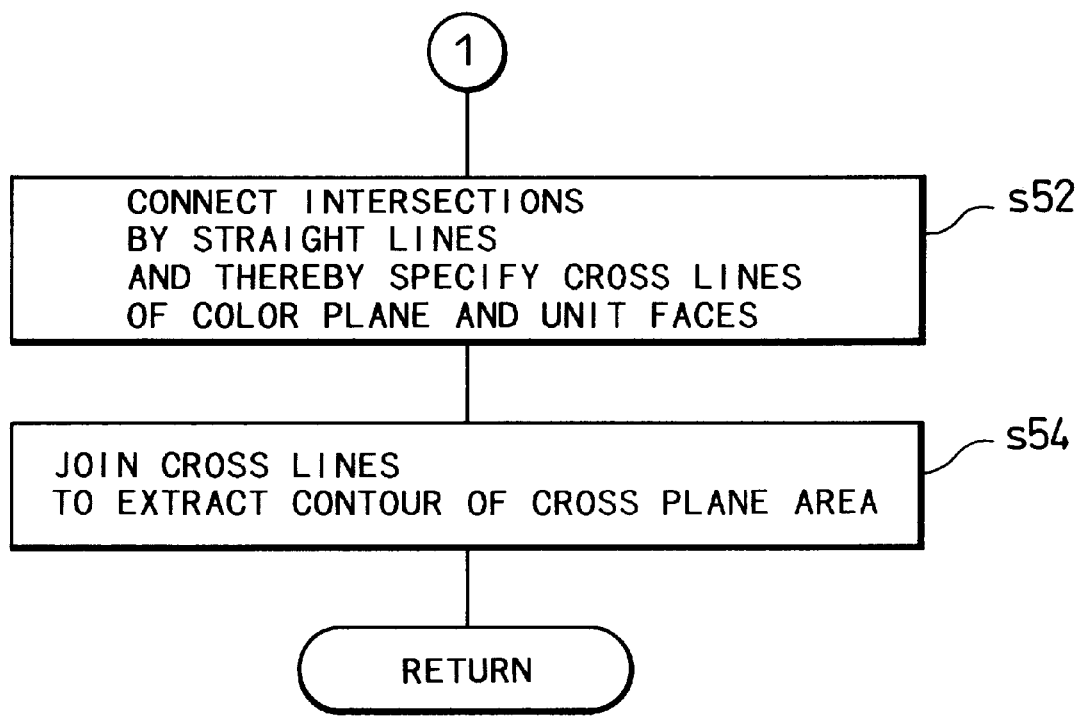

FIGS. 8 and 9 are flowcharts showing one procedure of the cross plane area extraction process executed at step s28 in the flowchart of FIG. 1. The following describes the concrete procedure of the cross plane area extraction process based on the flowcharts of FIGS. 8 and 9.

The cross plane area extracting element 68 selects a first cross boundary line that crosses the color plane CP out of the plurality of boundary lines at step s40, and determines an intersection of the selected cross boundary line and the color plane CP as a starting intersection at step s42.

The intersection of the color plane CP and the cross boundary line is determined in the following manner. The color plane CP existing in the three-dimensional Lab color space is generally expressed as Equation (1) given below:

$$x_1 L + x_2 a + x_3 b + x_4 = 0 \tag{1}$$

where $x_1$, $x_2$, $x_3$, and $x_4$ denote predetermined constants.

The boundary line S connecting a representative color point $P_p$ defined by coordinates $(L_p, a_p, b_p)$ to a representative color point $P_q$ defined by coordinates $L_q,a_q,b_q$) in the Lab color space is generally expressed as Equations (2) given below:

$$L=L_p+t(L_q-L_p)$$
$$a=a_p+t(a_q-a_p)$$
$$b=b_p+t(b_q-b_p) \quad (2)$$

where t denotes a parameter and satisfies $0 \leq t \leq 1$.

Coordinates of an intersection P of the color plane CP and the boundary line S are thus determined as Equations (3) given below:

$$L=L_p+t_0(L_q-L_p)$$
$$a=a_p+t_0(a_q-a_p)$$
$$b=b_p+t_0(b_q-b_p) \quad (3)$$

when $t_0$ satisfies $0 \leq t_0 \leq 1$, where $$t_0 = \frac{-(x_1 L_p + x_2 a_p + x_3 b_3 + x_4)}{x_1(L_q - L_p) + x_2(a_q - a_p) + x_3(b_q - b_p)}.$$

Figure 10:
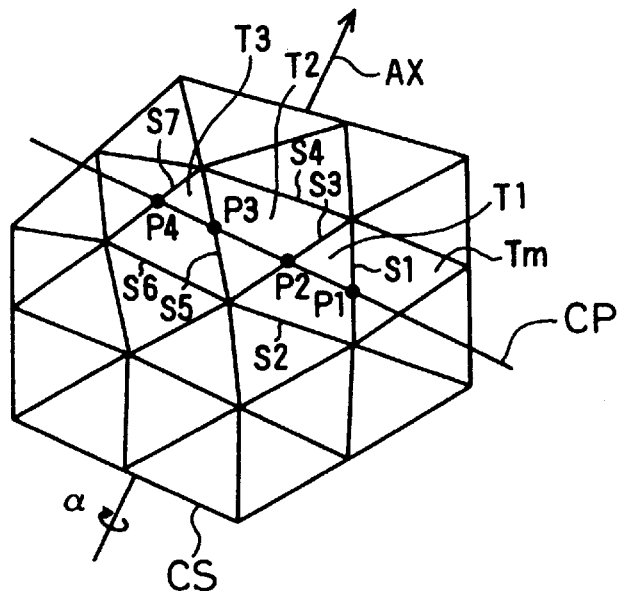
FIG. 10 shows boundary lines S that cross a color plane CP and their intersections P.
Figure 11A:
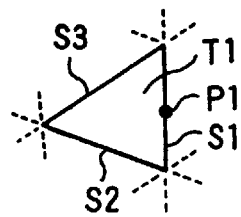
FIGS. 11(a), 11(b), and 11(c) show a process of specifying the boundary lines S that cross the color plane CP.
Figure 11B:
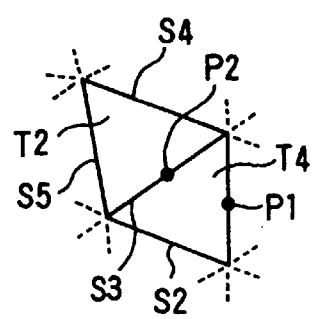
Figure 11C:
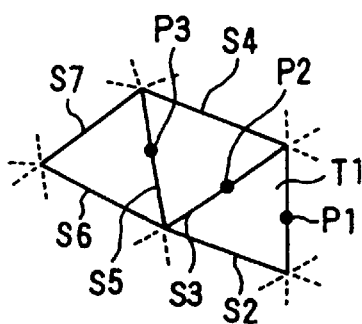

FIG. 10 shows the boundary lines S that cross the color plane CP and their intersections P. FIGS. 11(a), 11(b), and 11(c) show a process of specifying the boundary lines S that cross the color plane CP.

It is here assumed that the color plane CP intersects the gamut CS as shown in FIGS. 7 and 10 and that a boundary line S1 is selected as the first cross boundary line at step s40 in the flowchart of FIG. 8. In this case, an intersection P1 of the color plane CP and the cross boundary line S1 is determined as a starting intersection at step s42.

A concrete procedure of selecting the first cross boundary line out of a plurality of boundary lines will be discussed later.

The cross plane area extracting element 68 subsequently selects a unit face that is surrounded by three boundary lines including the selected cross boundary line, out of the plurality of unit faces at step s44.

When the boundary line S1 is selected as the first cross boundary line at step s40, for example, a unit face Ti shown in FIG. 10 is selected at step s44. The triangle unit face TI is surrounded by three boundary lines S1, S2, and S3 as shown in FIG. 11(a), where the boundary line S1 is a cross boundary line.

As clearly shown in FIG. 10, the cross boundary line S1 is also included in the three boundary lines surrounding another triangle unit face Tm. The unit face Tm may accordingly be selected at step s44. In this embodiment, however, unit faces are successively selected in the direction of an arrow α around the reference axis AX, so that the unit face T1 is selected at step s44.

At subsequent step s46, the cross plane area extracting element 68 selects a cross boundary line that crosses the color plane CP, out of the two boundary lines surrounding the unit face selected at step s44 other than the selected first cross boundary line. When one boundary line of the triangle unit face crosses the color plane, one of the other two boundary lines always crosses the color plane, except in the special cases discussed later.

When the unit face T1 is selected at step s44, the cross plane area extracting element 68 determines whether each of the two boundary lines S2 and S3 surrounding the unit face T1 other than the selected first cross boundary line S1 intersects the color plane CP and selects the boundary line that crosses the color plane CP. In this example, the boundary line S3 intersects the color plane CP.

At step s48, the cross plane area extracting element 68 determines an intersection of the cross boundary line selected at step s46 and the color plane CP.

When the boundary line S3 is selected as the cross boundary line at step s46, P2 is determined as the intersection of the color plane CP and the cross boundary line S3 as shown in FIG. 11(b).

At subsequent step s50, the cross plane area extracting element 68 determines whether or not the intersection determined at step s48 coincides with the starting intersection obtained at step s42. In case that they are not coincident with each other, the program returns to step s44. In case that they are coincident with each other, on the contrary, the program proceeds to step s52 shown in the flowchart of FIG. 9.

When P2 is obtained as the intersection at step s48, the intersection P2 does not coincide with the starting intersection P2. The program accordingly returns to step s44 and repeats the processing of and after step s44.

As shown in FIG. 11(b), the cross plane area extracting element 68 selects another unit face T2 at step s44, and determines whether or not each of the other two boundary lines S4 and S5 surrounding the unit face T2 other than the cross boundary line S3 intersects the color plane CP, in order to select another cross boundary line at step s46. When the boundary line S5 is selected as the cross boundary line, P3 is determined as the intersection of the color plane CP and the selected cross boundary line S5 at step s47 as shown in FIG. 11(c).

In this manner, the cross plane area extracting element 68 follows the adjoining unit faces, successively selects cross boundary lines, and determines intersections of the color plane CP and the selected cross boundary lines, until going around the reference axis AX when P1 is determined as the intersection at step s48. It is here determined at step s50 that the intersection P1 determined at step s48 coincides with the starting intersection P1 obtained at step s42, and the program proceeds to step s52 in the flowchart of FIG. 9.

Data regarding the cross boundary lines and the intersections thus obtained are registered in the memory 70 or the hard disk 30 shown in FIG. 2.

At step s52 in the flowchart of FIG. 9, the cross plane area extracting element 68 successively connects the intersections obtained at steps s42 and s44 by straight lines and thereby specifies cross lines of the color plane CP and the unit faces T that intersect the color plane CP. The cross plane area extracting element 68 then joins the cross lines and thereby extracts a contour CL of a cross plane area IP obtained by causing the color plane CP to cross the gamut CS at step s54.

For example, when the color plane CP intersects the gamut CS as shown in FIGS. 7 and 10, the intersection gives the contour CL of the cross plane area IP shown in FIG. 12(b).

FIGS. 12(a) and 12(b) show the contour CL of the cross plane area IP extracted according to the cross plane area extraction process shown in the flowcharts of FIGS. 8 and 9. FIG. 12(a) is identical with FIGS. 7 and 10 and shows the gamut CS and the color plane CP that intersects the gamut CS. FIG. 12(b) shows the contour CL of the cross plane area IP obtained as the result of intersection. Data regarding the contour of the cross plane area thus obtained are registered in the memory 70 or the hard disk 30.

There are some special cases in the cross plane area extraction process shown in the flowcharts of FIGS. 8 and 9, depending upon the positional relationship between the color plane CP and the representative color points, the boundary lines, and the unit faces.

Figure 13A:
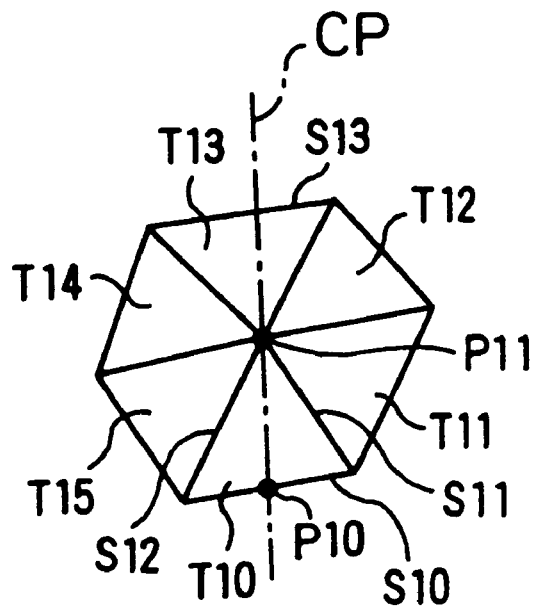
FIGS. 13(a) and 13(b) show some special cases in the cross plane area extraction process.
Figure 13B:
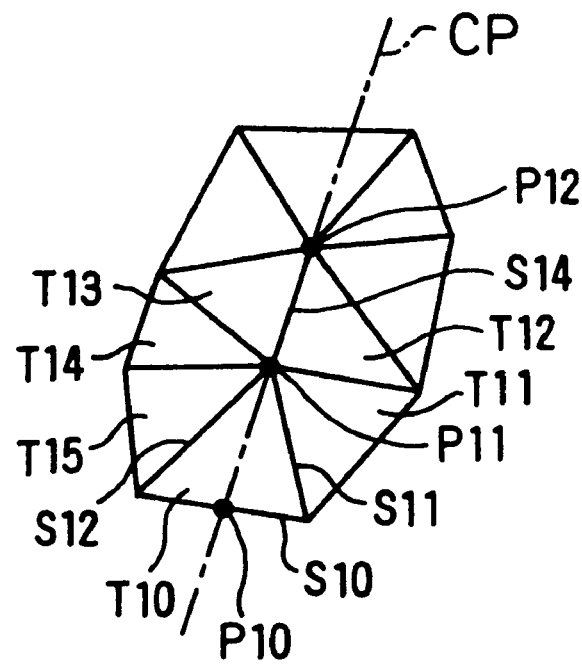

FIGS. 13(a) and 13(b) show some special cases in the cross plane area extraction process.

By way of example, the following exceptional processing is carried out when a representative color point P11 is included in the color plane CP as shown in FIG. 13(a). It is here assumed that S10 is selected as the cross boundary line, P10 is determined as the intersection, and T10 is selected as the unit face. In this case, both the two boundary lines S11 and S12 surrounding the unit face T10 other than the selected cross boundary line S10 are specified as the next cross boundary lines, whereas the representative color point P11 included in the color plane CP is determined as the next intersection. The subsequent process selects one out of a plurality of unit faces T11 through T15 that share the intersection P11, for example, the unit face T13. A boundary line S13 that faces the intersection P11 is then selected as the next cross boundary line with respect to the selected unit face T13.

As another example, the following exceptional processing is carried out when a boundary line S14 is included in the color plane CP as shown in FIG. 13(b). After P11 is determined as the intersection, two unit faces T12 and T13 that share the boundary line S14 are selected among the plurality of unit faces T11 through T15 that share the intersection P11. The subsequent process selects the boundary line S14 included in the color plane CP as the next cross boundary line, and determines an end point P12 of the cross boundary line S14 opposite to the intersection P11 as the next intersection.

In another special case, a unit face is included in the color plane CP. Since the unit face intersects the color plane CP by the face instead of by the line in this case, appropriate correction is required prior to determination of cross lines.

After the completion of the cross plane area extraction process at step s28 in the flowchart of FIG. 1, the color plane setting element 66 of the CPU 60 determines whether or not another color plane can be set for the gamut at step s30. In case that another color plane is settable, the program returns to step s26, at which the color plane setting element 66 sets another color plane to cross the gamut.

Figure 14:
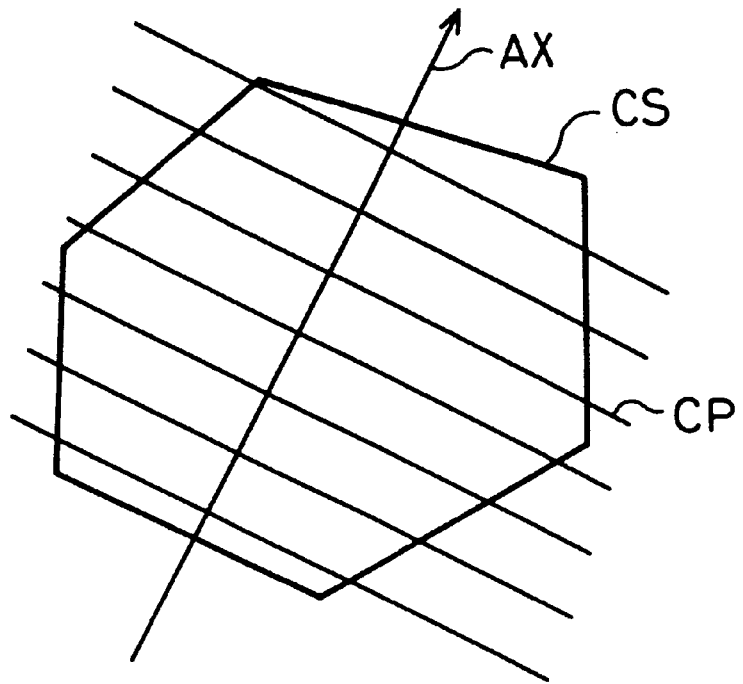
FIG. 14 shows a plurality of color planes specified to cross the reference axis AX at right angles.

FIG. 14 shows a plurality of color planes specified to cross the reference axis AX at right angles.

In this embodiment, the color plane setting element 66 specifies a color plane to perpendicularly cross the reference axis AX that passes through the gamut CS as discussed in FIG. 7. Such a color plane is set with respect to the gamut CS at step s26 in every cycle of the loop of steps s26 through s30 in the flowchart of FIG. 1. The resulting color planes are shown in FIG. 14.

In this manner, color planes that cross the gamut CS are successively specified, and a contour of a cross plane area obtained by causing each specified color plane to intersect the gamut CS is extracted.

When all the possible color planes have been set for the gamut CS and it is determined at step s30 that no other color planes are settable, the program concludes the processing routine of FIG. 1.

The user can readily recognize the exact shape of the gamut by examining the contour of the cross plane area of each color plane obtained in the above manner.

In this embodiment, each color plane is set to perpendicularly cross the reference axis AX passing through the gamut CS as shown in FIG. 14. Each color plane may, however, be set to include the reference axis AX passing through the gamut CS as shown in FIG. 15.

Figure 15:
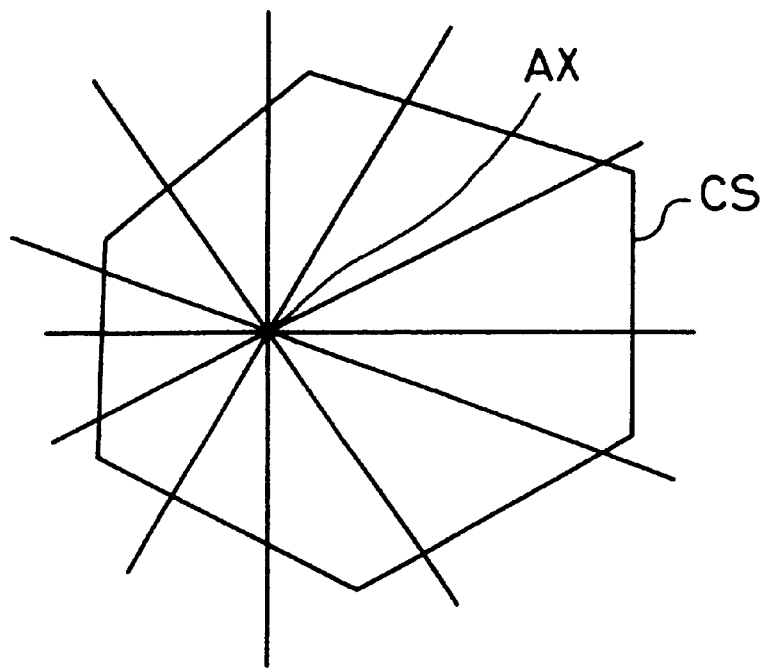
FIG. 15 shows a plurality of color planes specified to include the reference axis AX.

FIG. 15 shows a plurality of color planes specified to include the reference axis AX. In the drawing of FIG. 15, the reference axis AX is arranged to be perpendicular to the sheet face.

In the case of either FIG. 14 or FIG. 15, the reference axis AX may be arranged at an arbitrary position and in an arbitrary orientation with respect to the gamut CS.

A color plane may be set at an arbitrary position and in an arbitrary orientation with respect to the gamut CS, irrespective of the reference axis AX.

As discussed above, even when a color plane is arranged at any position and in any orientation with respect to the gamut CS, the process of this embodiment can specify cross lines with respect to all the unit faces that intersect the color plane and thereby accurately extract the contour of a cross plane area obtained by causing the color plane to cross the gamut CS.

The following describes the details of the process of selecting the first cross boundary line that intersects the color plane at step s40 in the flowchart of FIG. 8, which shows the cross plane area extraction process as discussed previously.

The following process is carried out when the color plane is set to perpendicularly cross the reference axis AX passing through the gamut CS as shown in FIG. 14 in the color plane setting process executed at step 26 in the flowchart of FIG. 1.

Figure 16:
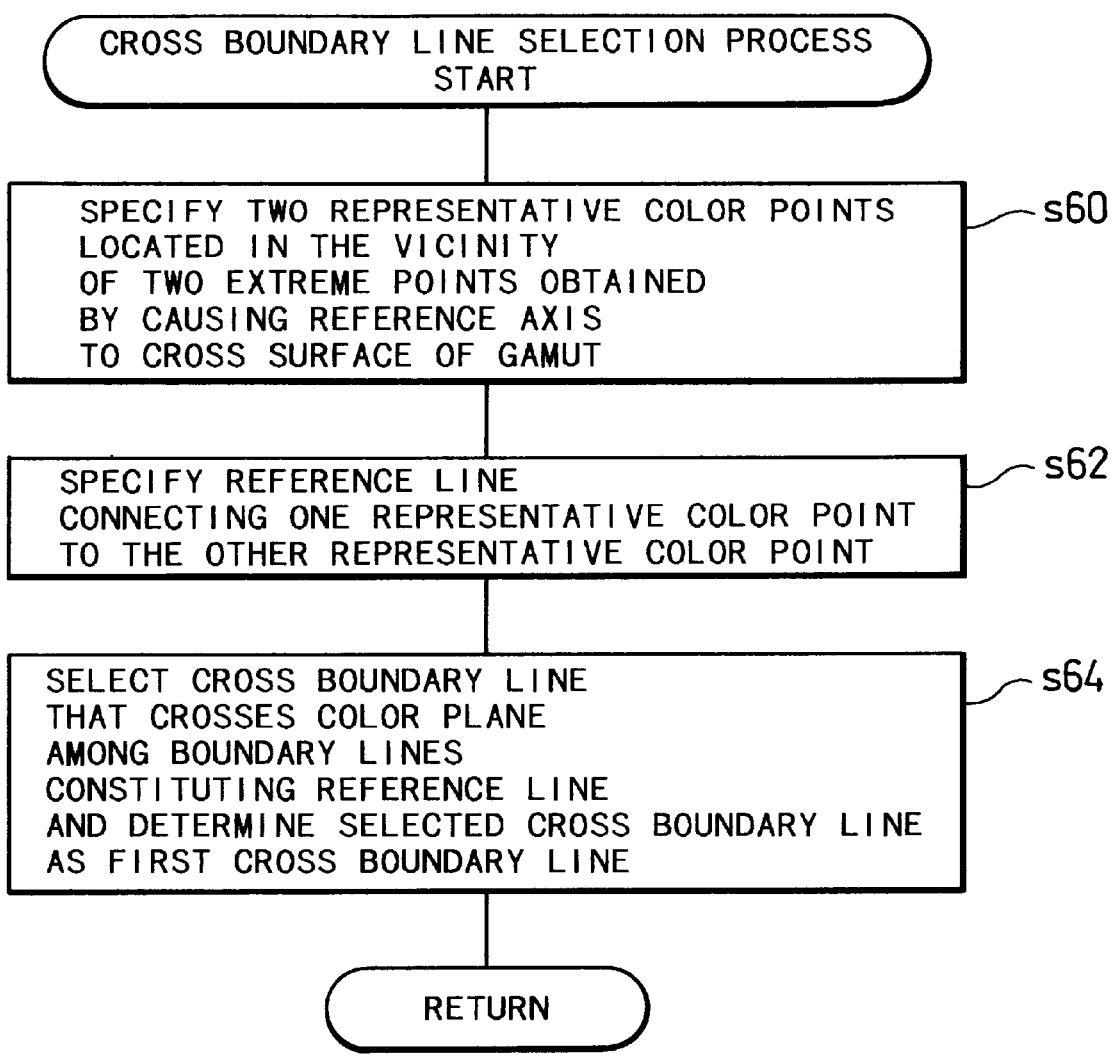
FIG. 16 is a flowchart showing one procedure of the cross boundary line selection process executed at step s40 in the flowchart of FIG. 8.
Figure 17:
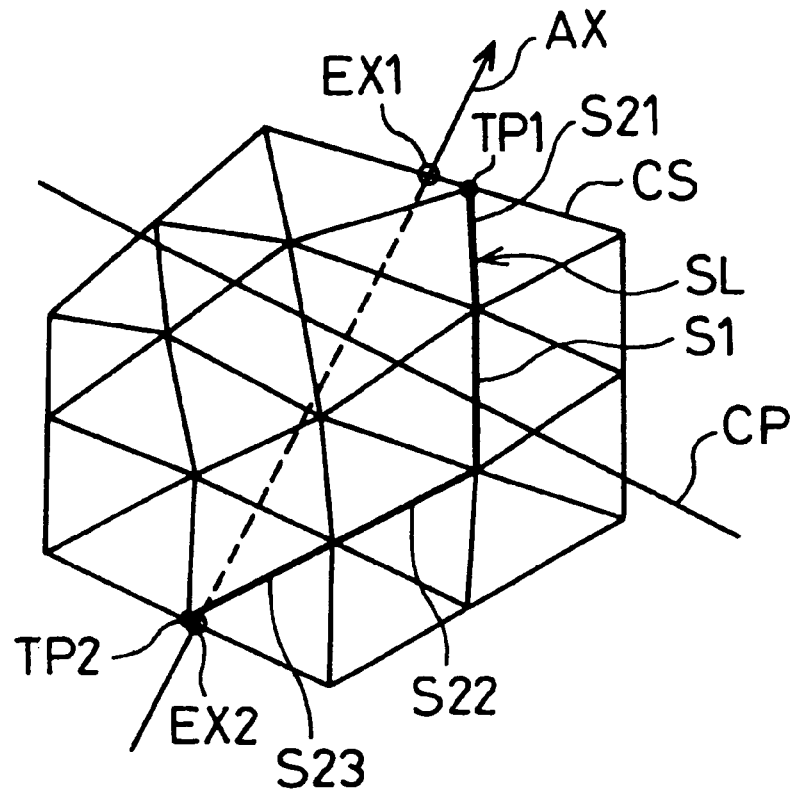
FIG. 17 shows the contents of the cross boundary line selection process of FIG. 16.

FIG. 16 is a flowchart showing one procedure of the cross boundary line selection process executed at step s40 in the flowchart of FIG. 8. FIG. 17 shows the contents of the cross boundary line selection process of FIG. 16.

It is here assumed that the color plane setting element 66 sets the color plane CP to perpendicularly cross the reference axis AX passing through the gamut CS as shown in FIG. 17. The cross plane area extracting element 68 specifies two representative color points TP1 and TP2 that are located respectively in the vicinity of two extreme points EX1 and EX2 obtained by causing the reference axis AX to intersect the surface of the gamut CS at step s60.

The cross plane area extracting element 68 then specifies a reference line SL that follows a plurality of boundary lines and connects one representative color point TP1 to the other representative color point TP2 at step s62. There are a plurality of reference lines that connect the representative color point TP1 to the representative color point TP2. In the example of FIG. 17, the reference line SL follows the four boundary lines S21, S1, S22, and S23.

The cross plane area extracting element 68 subsequently selects one cross boundary line that intersects the color plane CP among the plurality of boundary lines constituting the specified reference line SL and determines the selected cross boundary line as the first cross boundary line at step s64. In case that the specified reference line SL consists of the four boundary lines S21, S1, S22, and S23 as shown in FIG. 17, the procedure successively determines whether or not these four boundary lines cross the color plane CP. In this example, the boundary line S1 that crosses the color plane CP is specified as the first cross boundary line as shown in FIG. 10.

When the color plane CP is set to perpendicularly cross the reference axis AX, the above processing is carried out to enable the first cross boundary line to be selected at a high speed. Especially the method of specifying the reference line to include the least possible number of boundary lines further enhances the processing speed of selecting the first cross boundary line.

The following process is carried out, on the other hand, when the color plane is set to include the reference axis AX passing through the gamut CS as shown in FIG. 15 in the color plane setting process executed at step 26 in the flowchart of FIG. 1.

Figure 19:
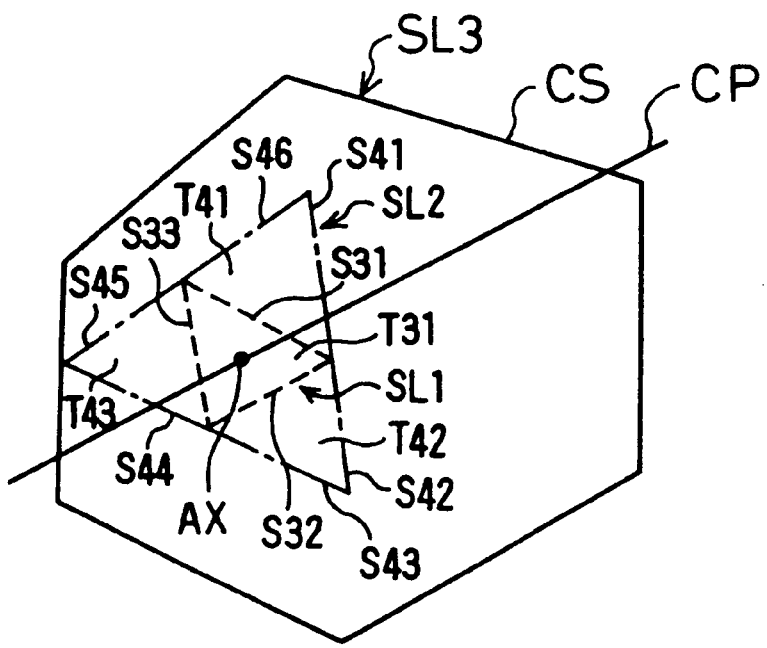
FIG. 19 shows the contents of the cross boundary line selection process of FIG. 18.
Figure 18:
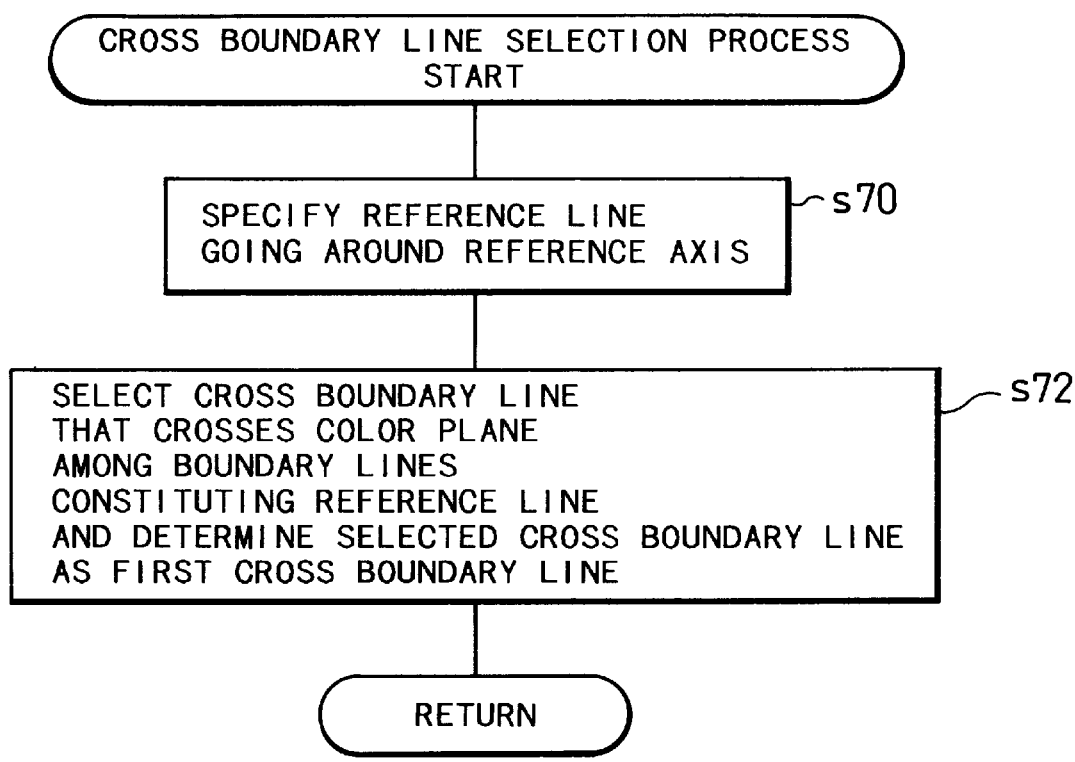
FIG. 18 is a flowchart showing another procedure of cross boundary line selection process executed at step s40 in the flowchart of FIG. 8.

FIG. 18 is a flowchart showing another procedure of the cross boundary line selection process executed at step s40 in the flowchart of FIG. 8. FIG. 19 shows the contents of the cross boundary line selection process of FIG. 18.

It is here assumed that the color plane setting element 66 sets the color plane CP to include the reference axis AX passing through the gamut CS as shown in FIG. 19. The cross plane area extracting element 68 specifies a reference line SL that follows a plurality of boundary lines and goes around the reference axis AX at step s70. There are a plurality of reference lines that go around the reference axis AX, for example, SL1, SL2, and SL3, as shown in FIG. 19. The reference line SL1 consists of three boundary lines S31 through S33 that surround one unit face T31, which the reference axis AX passes through. The reference line SL2 consists of six boundary lines S41 through S46 that surround the above unit face T31 as well as other three unit faces T41 through T43. The reference line SL3 represents the largest circumference of the face perpendicular to the reference axis AX. One out of these plurality of reference lines is set as the reference line SL at step s70.

The cross plane area extracting element 68 subsequently selects one cross boundary line that intersects the color plane CP among the plurality of boundary lines constituting the specified reference line SL and determines the selected cross boundary line as the first cross boundary line at step s72. For example, when the specified reference line SL is SL1 consisting of the three boundary lines S31, S32, and S33 as shown in FIG. 19, the procedure successively determines whether or not these three boundary lines cross the color plane CP. Since the reference line SL goes around the reference axis AX, there are generally two boundary lines that cross the color plane CP. The first boundary line detected to cross the color plane CP in the above sequential determination is specified as the first cross boundary line.

When the color plane CP is set to include the reference axis AX, the above processing is carried out to enable the first cross boundary line to be selected at a high speed. Especially the method of specifying the reference line to include the least possible number of boundary lines, like the reference line SL1 shown in FIG. 19, further enhances the processing speed of selecting the first cross boundary line.

As discussed in FIG. 14 or FIG. 15, the reference axis AX can be set at an arbitrary position and in an arbitrary orientation with respect to the gamut CS. The reference axis AX may accordingly coincide with the axis of achromatic color (that is, the axis L) in the Lab color space.

It is assumed that the reference axis AX coincides with the axis of achromatic color. In case that the color planes to cross the gamut are set to perpendicularly intersect the reference axis AX as shown in FIG. 14, the respective color planes pass through the same brightness and form faces of identical brightness. In case that the color planes to cross the gamut are set to include the reference axis as shown in FIG. 15, on the other hand, the respective color planes pass through the same hue and form faces of identical hue.

Figure 20:
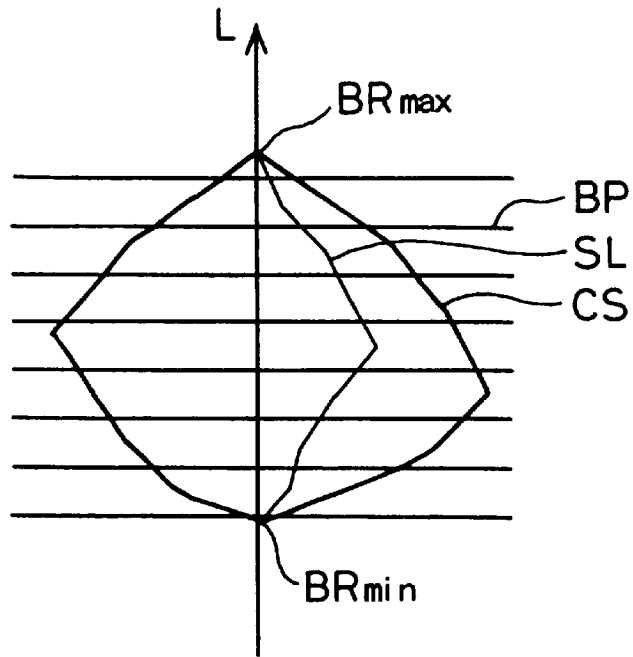
FIG. 20 shows an example in which color planes to cross the gamut are set as faces of identical brightness.
Figure 21:
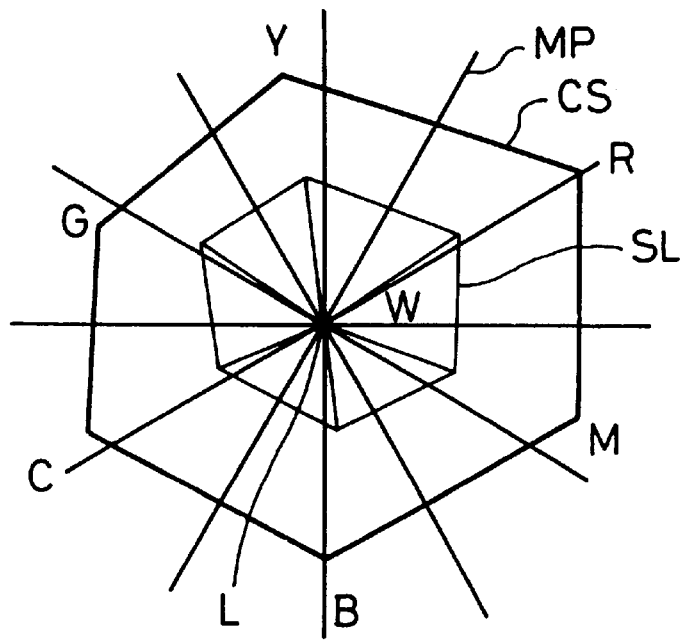
FIG. 21 shows another example in which color planes to cross the gamut are set as faces of identical hue.

FIG. 20 shows an example in which color planes to cross the gamut are set as faces of identical brightness, whereas FIG. 21 shows another example in which color planes to cross the gamut are set as faces of identical hue.

When the color planes are set as faces of identical brightness as shown in FIG. 20, boundary lines that intersect the faces of identical brightness and their intersections are determined in the following manner.

According to the flowchart of FIG. 16, two representative color points located in the vicinity of two extreme points at which the surface of the gamut CS crosses the axis of achromatic color (that is, the axis L) correspond to a maximum-brightness color point BRmax having the maximum brightness and a minimum-brightness color point BRmin having the minimum brightness among the representative color points belonging to the gamut CS as shown in FIG. 20. The representative color points between the maximum-brightness color point BRmax and the minimum-brightness color point BRmin are sorted in the order of brightness. A reference line SL is then specified to follow the boundary lines connecting these sorted representative color points between the maximum-brightness color point BRmax and the minimum-brightness color point BRmin. It is subsequently determined in the order of brightness whether or not each boundary line included in the reference line SL crosses a desired face of identical brightness BP. A cross boundary line that intersects the face of identical brightness BP is then determined as the first cross boundary line.

An intersection of the face of identical brightness BP and a boundary line is determined in the following manner.

As discussed previously, the color plane existing in the three-dimensional Lab color space is generally expressed as Equation (1) given above. The face of identical brightness BP that is perpendicular to the axis of achromatic color is an exceptional color plane. The face of identical brightness BP passing through a desired representative color point $P_r(L_r, a_r, b_r)$ is expressed as Equation (4) given below:

$$L - L_r = 0 \qquad (4)$$

Equation (4) corresponds to Equation (1) in which the respective constants are $x_1=1$, $x_2=0$, $x_3=0$, and $x_4=-L_r$.

A boundary line S connecting a representative color point $P_p(L_p, a_p, b_p)$ to another representative color point $P_q(L_q, a_q, b_q)$ crosses the face of identical brightness BP when $t_0$ satisfies $0 \leq t_0 \leq 1$, where $t_0 = (L_r - L_p)/(L_q - L_p)$. The coordinates of an intersection P of the boundary line S and the face of identical brightness BP are defined as $L = L_p + t_0(L_q - L_p)$, $a = a_p + t_0(a_q - a_p)$, and $b = b_p + t_0(b_q - b_p)$.

When the color planes are set as faces of identical hue as shown in FIG. 21, on the other hand, boundary lines that intersect the faces of identical hue and their intersections are determined in the following manner.

According to the flowchart shown in FIG. 18, representative color points around the axis of achromatic color (that is, the axis L) are sorted counterclockwise from the representative color point closest to the positive side of the axis a. A reference line SL is then specified to follow the boundary lines connecting these sorted representative color points and go round the axis of achromatic color. It is then determined counterclockwise around the axis of achromatic color whether or not each boundary line included in the reference line SL crosses a desired face of identical hue MP. A cross boundary line that intersects the face of identical hue MP is then determined as the first cross boundary line.

An intersection of the face of identical hue MP and a boundary line is determined in the following manner. Like the face of identical brightness BP, the face of identical hue MP that includes the axis of achromatic color is an exceptional color plane. The face of identical hue MP passing through a desired representative color point $P_r(L_r, a_r, b_r)$ is expressed as Equation (5) given below:

$$b_r a - a_r b = 0 \qquad (5)$$

Equation (5) corresponds to Equation (1) in which the respective constants are $x_1=0$, $x_2=b_r$, $x_3=-a_r$, and $x_4=0$.

A boundary line S connecting a representative color point $P_p(L_p,a_p,b_p)$ to another representative color point $P_q(L_q,a_q,b_q)$ crosses the face of identical hue MP when $t_0$ satisfies $0 \leq t_0 \leq 1$, where $t_0=(a_rb_p-b_ra_p)/\{b_r(a_p-a_q)-a_r(b_q-b_p)\}$. The coordinates of an intersection P of the boundary line S and the face of identical hue MP are defined as $L=L_p+t_0(L_q-L_p)$, $a=a_p+t_0(a_q-a_p)$, and $b=b_p+t_0(b_q-b_p)$.

As discussed above, when the reference axis AX is the axis of achromatic color (that is, the axis L) in the Lab color space and the color plane to cross the gamut is either a face of identical brightness or a face of identical hue, the calculation is simplified. A boundary line that crosses the color plane and its intersection is thus readily determined.

The present invention is not restricted to the above embodiment or its modified examples, but there maybe many other modifications, changes, and alterations without departing from the scope or spirit of the main characteristics of the present invention.

In the above embodiment, the cross plane area extraction process at step s28 in the flowchart of FIG. 1 is carried out according to the flowcharts of FIGS. 8 and 9. The procedure successively selects cross boundary lines that cross the color plane CP among a plurality of boundary lines, determines intersections of the respective cross boundary lines and the color plane CP, selects unit faces that intersect the color plane CP among a plurality of unit faces based on the selected cross boundary lines, and connects the intersections by straight lines to specify cross lines of the color plane CP and the selected unit faces. The principle of the present invention is, however, not restricted to this procedure. As shown in the flowchart of FIG. 22, another possible procedure directly selects the unit faces that cross the color plane CP among a plurality of unit faces and determines cross lines of the color plane CP and the selected unit faces.

Figure 22:
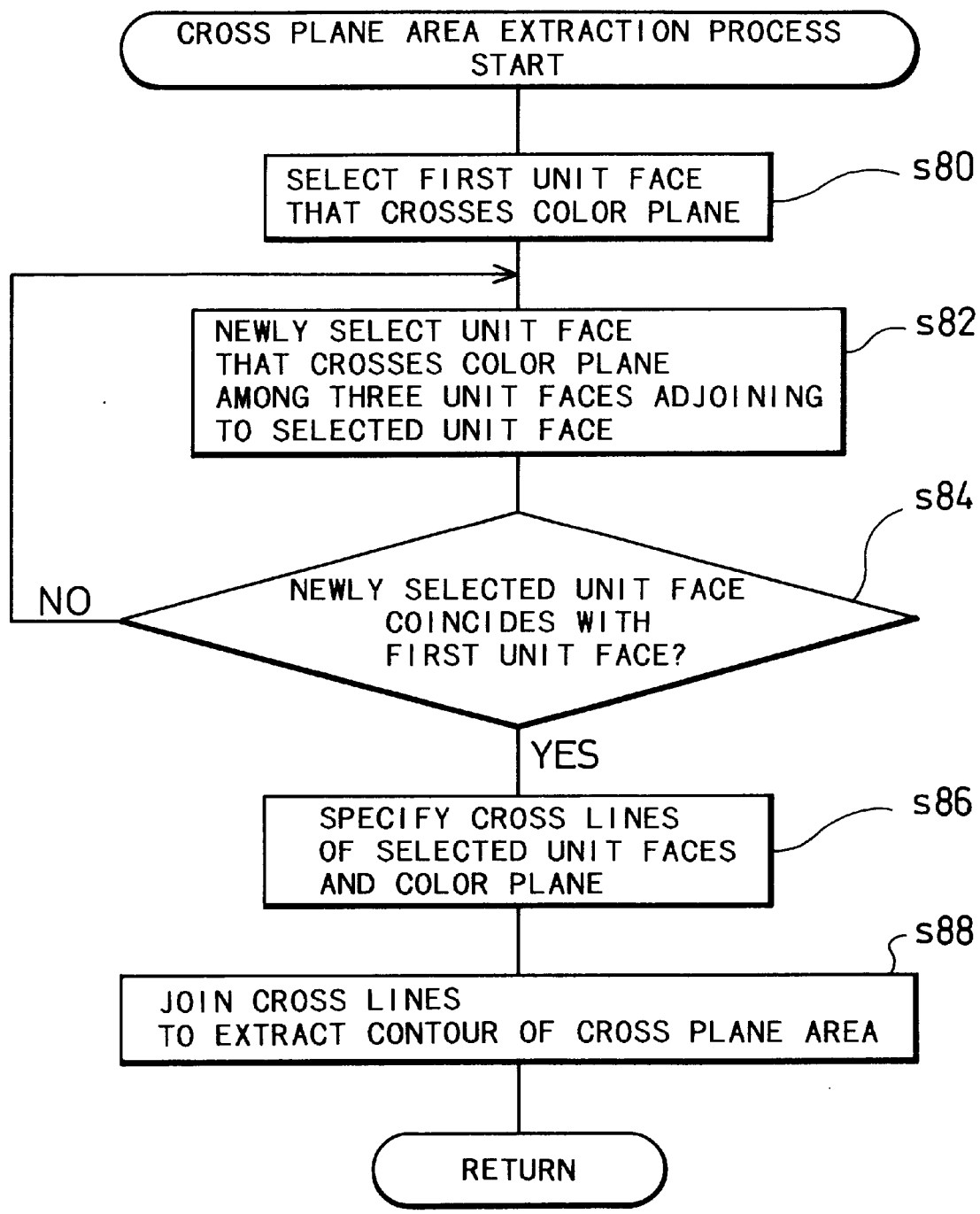
FIG. 22 is a flowchart showing another procedure of the cross plane area extraction process carried out at step s28 in the flowchart of FIG. 1.

FIG. 22 is a flowchart showing another procedure of the cross plane area extraction process at step s28 in the flowchart of FIG. 1. The cross plane area extracting element 68 selects a first unit face that crosses the color plane CP among a plurality of unit faces at step s80. The cross plane area extracting element 68 then selects a next unit face that crosses the color plane CP among three unit faces adjoining to the selected first unit face at step s82. Since the unit face has a triangle shape, each unit face has three adjoining unit faces. When the selected unit face intersects the color plane CP, two unit faces among the three adjoining unit faces also intersect the color plane CP, except in some special cases, for example, in the case that a representative color point is included in the color plane CP. The cross plane area extracting element 68 accordingly selects one out of the two unit faces intersecting the color plane CP at step s82.

The cross plane area extracting element 68 determines at step s84 whether or not the unit face selected at step s82 coincides with the first unit face selected at step s80. When they are not coincident, the program returns to step s82. When they are coincident, on the other hand, the program proceeds to step s86.

In this manner, the cross plane area extracting element 68 follows the adjoining unit faces and successively selects a unit face that crosses the color plane CP until the unit face selected at step s82 coincides with the first unit face selected at step s80. When the processing goes around the reference axis AX, the unit face selected at step s82 coincides with the first unit face, and the program proceeds to step s86.

The cross plane area extracting element 68 specifies cross lines of the respective unit faces selected at step s80 and s82 and the color lane CP at step s86, and then joins the cross lines to extract a contour CL of a cross plane area IP obtained by causing the color plane CP to cross the gamut CS at step s88.

In this manner, the contour CL of the cross plane area IP may be extracted by directly selecting the unit faces that cross the color plane CP.

The process of selecting the first unit face that crosses the color plane CP at step s80 in the flowchart of FIG. 22 is realized according to the orientation of the color plane CP with respect to the gamut CS.

The following process is carried out when the color plane is set to perpendicularly cross the reference axis AX passing through the gamut CS as shown in FIG. 14 in the color plane setting process executed at step 26 in the flowchart of FIG. 1.

Figure 23:
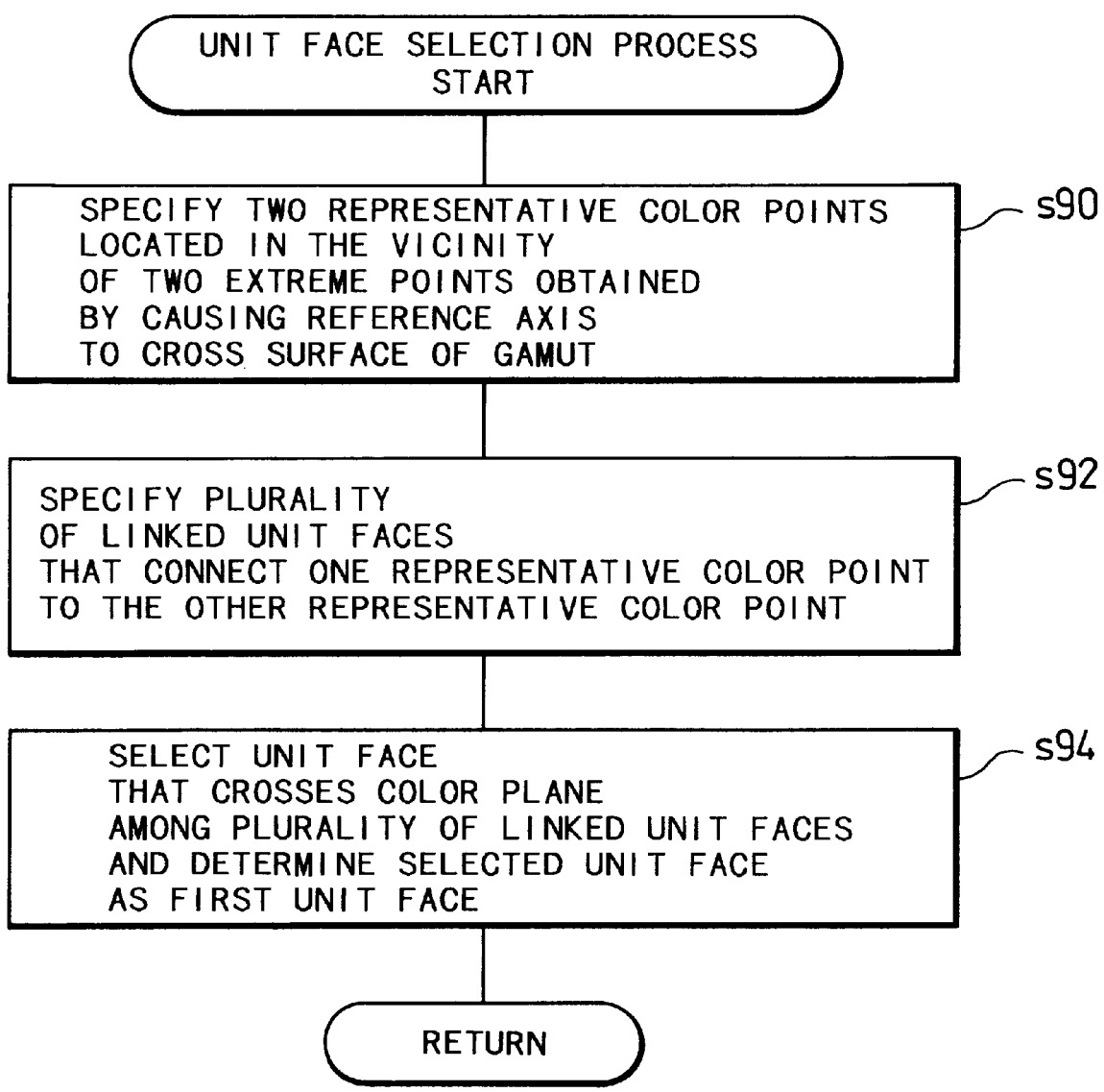
FIG. 23 is a flowchart showing one procedure of the unit face selection process carried out at step s80 in the flowchart of FIG. 22.

FIG. 23 is a flowchart showing one procedure of the unit face selection process executed at step s80 in the flowchart of FIG. 22.

It is here assumed that the color plane setting element 66 sets the color plane CP to perpendicularly cross the reference axis AX passing through the gamut CS as shown in FIG. 14. The cross plane area extracting element 68 specifies two representative color points that are located respectively in the vicinity of two extreme points obtained by causing the reference axis AX to intersect the surface of the gamut CS at step s90. The cross plane area extracting element 68 then specifies a route that includes a plurality of unit faces and connects one representative color point to the other representative color point at steps s92. The cross plane area extracting element 68 subsequently selects one unit face that crosses the color plane CP among the plurality of specified unit faces and determines the selected unit face as the first unit face at step s94.

When the color plane CP is set to perpendicularly cross the reference axis AX, the above processing is carried out to enable the first unit face to be selected at a high speed.

The following process is carried out, on the other hand, when the color plane is set to include the reference axis AX passing through the gamut CS as shown in FIG. 15 in the color plane setting process executed at step 26 in the flowchart of FIG. 1.

Figure 24:
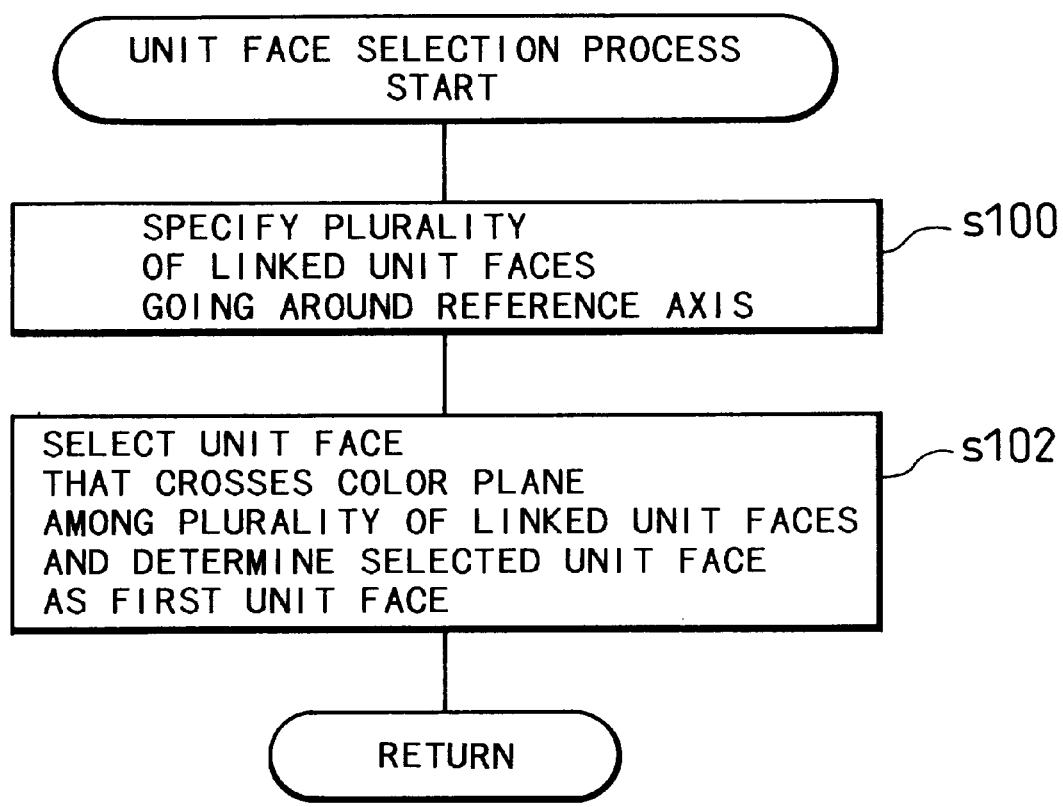
FIG. 24 is a flowchart showing another procedure of the unit face selection process carried out at step s80 in the flowchart of FIG. 22.

FIG. 24 is a flowchart showing another procedure of the unit face line selection process executed at step s80 in the flowchart of FIG. 22.

It is here assumed that the color plane setting element 66 sets the color plane CP to include the reference axis AX passing through the gamut CS as shown in FIG. 15. The cross plane area extracting element 68 specifies a plurality of linked unit faceswhile goingaroundthereference axis AX at step s100. The cross plane area extracting element 68 then selects one unit face that crosses the color plane CP among the plurality of specified unit faces and determines the selected unit face as the first unit face at step s102.

When the color plane CP is set to include the reference axis AX, the above processing is carried out to enable the first unit face to be selected at a high speed.

Although the above embodiment refers to a gamut representing the color reproducible range of a printer, the principle of the present invention is not restricted to the gamut of the printer but may be applicable to gamuts representing color reproducible ranges of various devices, such as image recording apparatuses other than the printers, image display apparatuses such as monitors, and image reading apparatuses such as scanners.

Although the above embodiment refers to the Lab color space, the principle of the present invention is not restricted to the Lab color space but maybe applicable to other color spaces, such as XYZ color space, CMY color space, and RGB color space.

Although the unit face is a plane in the above embodiment, the unit face may be a curved surface. The triangular unit face in the above embodiment may be replaced by a quadrangle unit face shown in FIG. 4 or a polygonal unit face, such as a pentagonal or hexagonal unit face. All the above processes for the triangle unit faces may be applied to the quadrangle or polygonal unit faces with a slight modification.

Although the boundary line joining the representative color points is a straight line (line segment) in the above embodiment, the boundary line may be a curve. One possible procedure, for example, connects the representative color points by divisional curves, in order to make the differential coefficients of the respective representative color points coincident with one another. Another possible procedure excludes some representative color points that are allowed to have different differential coefficients, and connects the other representative color points by divisional curves, in order to make the differential coefficients of the other respective representative color points coincident with one another.

In the above embodiment, the contour of the cross plane area eventually extracted represents the outer line of the cross plane area. According to the shape of the gamut, the contour of the cross plane area may represent the inner line of the cross plane area.

The number of the representative color points is not specifically mentioned in the above embodiment. When the gamut has a complicated shape, for example, the number of the representative color points may be locally increased in the complicated section.

It should be clearly understood that the above embodiment is only illustrative and not restrictive in any sense. The scope and spirit of the present invention are limited only by the terms of the appended claims.

What is claimed is:

1. A method of extracting a contour of a cross plane area of a predetermined gamut existing in a color space, said gamut intersecting with a color plane in said cross plane area, said method comprising the steps of:
   (a) providing a plurality of representative color points on surface of said gamut;
   (b) setting a plurality of boundary lines that connect said plurality of representative color points substantially along the surface of said gamut, and defining a plurality of unit faces that are respectively surrounded by at least three of said boundary lines and arranged substantially along the surface of said gamut;
   (c) setting said color plane to cross said gamut; and
   (d) selecting unit faces that cross said color plane among said plurality of unit faces, obtaining cross lines where said selected unit faces crosses said color plane, and extracting the contour of said cross plane area from said cross lines.

2. A method in accordance with claim 1, wherein said step (d) comprises the steps of:
   (d-1) selecting a first cross boundary line that crosses said color plane among said plurality of boundary lines, and determining an intersection of said selected cross boundary line and said color plane;
   (d-2) selecting a unit face that is surrounded by a plurality of boundary lines including said selected cross boundary line among said plurality of unit faces;
   (d-3) selecting a next cross boundary line that crosses said color plane out of said plurality of boundary lines surrounding said selected unit face other than said selected cross boundary line, and determining an intersection of said next cross boundary line and said color plane;
   (d-4) repeating said step (d-2) andsaid step (d-3) while said next cross boundary line selected in said step (d-3) is used as said selected cross boundary line in said step (d-2); and
   (d-5) connecting said intersections obtained in said step (d-1) and said step (d-3) to obtain said cross lines, and extracting the contour of said cross plane area based on said cross lines.

3. A method in accordance with claim 2, wherein said color plane is set to cross at right angles a predetermined reference axis passing through said gamut in said step (c), and said step (d-1) comprises the steps of:
   (d-11) selecting first and second representative color points among said plurality of representative color points, said first and second representative color points being respectively located in the vicinity of two extreme points where said reference axis intersects with the surface of said gamut;
   (d-12) specifying a plurality of linked boundary lines selected among said plurality of boundary lines, said plurality of linked boundary lines connecting said first representative color point to said second representative color point; and
   (d-13) selecting a cross boundary line that crosses said color plane among said plurality of linked boundary lines, and determining said selected cross boundary line as said first cross boundary line.

4. A method in accordance with claim 3, wherein said color space is defined by brightness, saturation, and hue, and said reference axis corresponds to an axis of achromatic color.

5. A method in accordance with claim 2, wherein said color plane is set in said step (c) to include a predetermined reference axis passing through said gamut, said step (d-1) comprising the steps of:
   (d-11) specifying a plurality of linked boundary lines selected among said plurality of boundary lines, said plurality of linked boundary lines going around said reference axis; and
   (d-12) selecting a cross boundary line that crosses said color plane among said plurality of linked boundary lines and determining said selected cross boundary line as said first cross boundary line.

6. A method in accordance with claim 5, wherein said color space is defined by brightness, saturation, and hue, and said reference axis corresponds to an axis of achromatic color.

7. A method in accordance with claim 1, wherein said boundary line is a straight line.

8. A method in accordance with claim 7, wherein said unit face is a flat plane.

9. A method in accordance with claim 8, wherein said unit face has a triangle shape.

10. A method in accordance with claim 1, wherein said step (d) comprises the steps of:
   (d-1) selecting a first unit face that crosses said color plane among said plurality of unit faces;
   (d-2) selecting a next unit face that crosses said color plane among a plurality of unit faces adjoining to said selected unit face; and
   (d-3) repeating said step (d-2) to select the unit faces that cross said color plane.

11. A method in accordance with claim 10, wherein said color plane is set to cross at right angles a predetermined reference axis passing through said gamut in said step (c), said step (d-1) comprising the steps of:
- (d-11) selecting first and second representative color points among said plurality of representative color points, said first and second representative color points being respectively located in the vicinity of two extreme points obtained by causing said reference axis to intersect the surface of said gamut;
- (d-12) specifying a plurality of linked unit faces that connect said first representative color point to said second representative color point and are selected among said plurality of unit faces; and
- (d-13) selecting a unit face that crosses said color plane among said plurality of linked unit faces and determining said selected unit face as said first unit face.

12. A method in accordance with claim 10, wherein said color plane is set in said step (c) to include a predetermined reference axis passing through said gamut, said step (d-1) comprising the steps of:
- (d-11) specifying a plurality of linked unit faces that go around said reference axis and are selected among said plurality of unit faces; and
- (d-12) selecting a unit face that crosses said color plane among said plurality of linked unit faces and determining said selected unit face as said first unit face.

13. An apparatus for extracting a contour of a cross plane area of a predetermined gamut existing in a color space, said gamut intersecting with a color plane in said cross plane area, said apparatus comprising:

storage means for storing data regarding a plurality of representative color points on surface of said gamut;

boundary line setting means for setting a plurality of boundary lines that connect said plurality of representative color points substantially along the surface of said gamut, based on said data of said representative color points stored in said storage means;

unit face defining means for defining a plurality of unit faces that are respectively surrounded by at least three of said boundary lines and arranged substantially along the surface of said gamut;

color plane setting means for setting said color plane to cross said gamut; and cross plane area extracting means for selecting unit faces that cross said color plane among said plurality of unit faces, obtaining cross lines where said selected unit faces crosses said color plane, and extracting the contour of said cross plane area from said cross lines.

14. A computer program product for extracting a contour of a cross plane area of a predetermined gamut existing in a color space, said gamut intersecting with a color plane in said cross plane area, said computer program product comprising:

a computer readable medium;

first program code means for causing a computer to set a plurality of boundary lines that connect a plurality of representative color points substantially along surface of said gamut, said plurality of representative color points on the surface of said gamut and being provided in advance;

second program code means for causing the computer to define a plurality of unit faces that are respectively surrounded by at least three of said boundary lines and arranged substantially along the surface of said gamut;

third program code means for causing the computer to set said color plane to cross said gamut; and fourth program code means for causing the computer to select unit faces that cross said color plane among said plurality of unit faces, obtaining cross lines where said selected unit faces crosses said color plane, and extract the contour of said cross plane area from said cross lines, wherein all said program code means are recorded on said computer readable medium.

* * * * *